(12) United States Patent
Mahi et al.

(10) Patent No.: US 10,567,244 B1
(45) Date of Patent: Feb. 18, 2020

(54) NEAR REAL-TIME FEED MANAGER FOR DATA CENTER INFRASTRUCTURE MONITORING (DCIM) USING CUSTOM TAGS FOR INFRASTRUCTURE ASSETS

(71) Applicant: Equinix, Inc., Redwood City, CA (US)

(72) Inventors: Deepinder Singh Mahi, San Jose, CA (US); Ashwin Kamath, Sunnyvale, CA (US); Venkatachalam Rangasamy, San Jose, CA (US); Nilakandan Velu, Sengkang (SG); Mukul Kumar, Fremont, CA (US)

(73) Assignee: Equinix, Inc., Redwood City, CA (US)

( * ) Notice: Subject to any disclaimer, the term of this patent is extended or adjusted under 35 U.S.C. 154(b) by 80 days.

(21) Appl. No.: 15/893,377

(22) Filed: Feb. 9, 2018

(51) Int. Cl.
*H04L 12/26* (2006.01)
*H04L 29/08* (2006.01)
*G06Q 50/26* (2012.01)

(52) U.S. Cl.
CPC ............ *H04L 43/04* (2013.01); *G06Q 50/26* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,765,525 B1 * | 7/2010 | Davidson | G06F 11/3636 717/110 |
| 9,886,267 B2 | 2/2018 | Maheshwari et al. | |
| 9,948,521 B2 | 4/2018 | Doraiswamy et al. | |
| 9,948,552 B2 | 4/2018 | Teng et al. | |
| 2010/0017419 A1 * | 1/2010 | Francis | G06Q 10/06 705/1.1 |
| 2011/0018998 A1 * | 1/2011 | Guzik | H04N 21/21 348/143 |
| 2016/0124742 A1 | 5/2016 | Rangasamy et al. | |
| 2016/0127254 A1 | 5/2016 | Kumar et al. | |
| 2016/0359872 A1 * | 12/2016 | Yadav | H04L 43/04 |
| 2017/0201413 A1 * | 7/2017 | Marinelli | H04L 41/12 |

OTHER PUBLICATIONS

U.S. Appl. No. 62/517,464, by Venkatachalam Rangasamy et al., filed Jun. 9, 2017.

\* cited by examiner

*Primary Examiner* — Brian Whipple
(74) *Attorney, Agent, or Firm* — Shumaker & Sieffert, P.A.

(57) ABSTRACT

A messaging service is disclosed that provides access to data center event data for physical infrastructure assets via dynamically configurable custom tags defined by customers. For example, a network services exchange provider or co-location provider deploys a data center monitoring system that monitors physical infrastructure assets that enable system operation within a data center for events. The system implements an API which applies custom tags defined by customers to the assets, wherein each custom tag defines attributes of the assets. The system receives subscription requests that describe events and custom tags applied to the assets. The data center infrastructure monitoring system publishes a subscription of event data related to the events for the assets to which the custom tags are applied. Further, a feed manager receives updates to asset equipment and changes to metadata describing the assets and automatically updates the subscription to account for the changes.

24 Claims, 19 Drawing Sheets

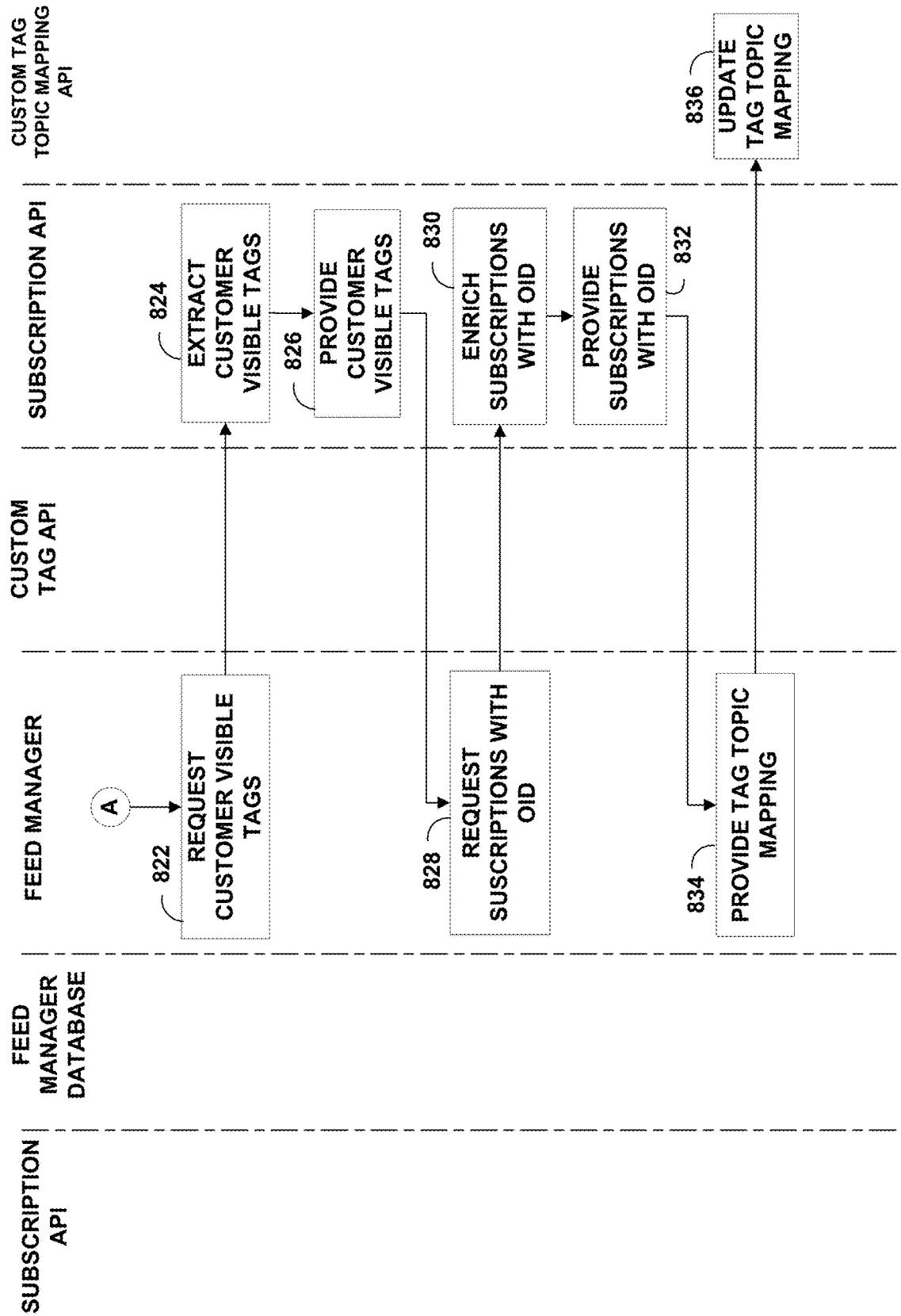

CUSTOM TAGS MANAGEMENT
HOME / CUSTOM TAGS

GLOBAL DATA CENTER MONITORING SYSTEM — Welcome, [USER]

| ALARMS | ALERTS | REPORTS | MAINTENANCE | NOTIFICATIONS | ASSET CONFIGURATOR |

SEARCH: [ TEMPLATE ]

| RULE | CUSTOMER | UPLOADED DATE | DATA CENTER |
|---|---|---|---|
| For AssetType = "AHU with Chilled Water" and tag="ChilledWaterValveCommand" | Customer1 | 2016-09-07 04:15 | DataCenter1 |
| For AssetType = "ASTS" and tags in ("AutoTransferEnabled", "AutoTransferInhibited") | Customer1 | 2016-09-07 04:19 | DataCenter1 |

PREVIOUS | 1 | NEXT

Showing 1 to 2 of 2 entries

NEAR REAL-TIME FEED MANAGER FOR DATA CENTER INFRASTRUCTURE MONITORING (DCIM) USING CUSTOM TAGS FOR INFRASTRUCTURE ASSETS

TECHNICAL FIELD

The disclosure relates to data centers and, more specifically, to monitoring data center infrastructure.

BACKGROUND

A network services exchange provider or co-location provider (a "provider") may deploy a data center in which multiple customers of the provider locate network, server, and storage gear and interconnect to a variety of telecommunications and other network service provider(s) with a minimum of cost and complexity. Data centers may be shared by multiple tenants locating networking, computing, and storage equipment within the data centers.

A data center may include a storage volume storing numerous electronic devices that produce heat, including network, server, and storage gear, as well as power distribution units for distributing power to devices within the facility, for example. The data center may also include cooling units to supply a cool air stream into the storage volume.

SUMMARY

In general, techniques are described for a messaging service that provides access to data center event data for physical infrastructure assets using dynamically configurable custom tags defined by customers. For example, a network services exchange provider or co-location provider ("provider") deploys a data center monitoring system that monitors non-customer physical infrastructure assets that enable system operation within a data center for events. The system implements an API which applies custom tags defined by customers to the non-customer physical infrastructure assets, wherein each custom tag defines attributes of the non-customer physical infrastructure assets. The data center monitoring system receives subscription requests that describe events and custom tags applied to the assets. The data center infrastructure monitoring system publishes a subscription of event data related to the events for the non-customer physical infrastructure assets to which the custom tags are applied. The event data may include, for example, alarm data; alert data; tagpoints describing properties of infrastructure assets such as HVAC (heating ventilation and air conditioning) units, computer room air conditioning units, power supplies, generators, power distribution units, and switchgears; power consumption data points; and environmental sensor data points.

In one example, the techniques of the disclosure describe a feed manager that receives updates to asset equipment and changes to metadata describing the assets and automatically updates the subscription to account for the changes. In one example, the feed manager comprises a real-time processor that handles transactions pertaining to real-time feeds (e.g., for machine data and power consumption data). The feed manager internally maintains a live registry of custom tags associated to a publisher topic. The feed manager constantly updates the live registry based on changes in metadata defined by either subscription of a user or by custom tag rules. Such changes in metadata may include, for example, changes to custom rules or custom tags defined by customer. Such changes in metadata may further include changes in permissions of the customer. Accordingly, the system of the techniques disclosure herein provides an interface to make available to the customer real-time data feeds, which typically available are inaccessible to the customer. In some examples, the feed manager includes a single-queue sequential request processing engine that allows the feed manager to handle feed registrations by customer, the data center monitoring system may perform custom tag rule metadata changes and similar metadata changes in a data processing layer underneath a cache loader layer for the data center monitoring system.

In some examples, a computing system executes a messaging service that applies real-time processing to the events and publishes the processed events to custom topics of a publication platform to enable application programming interface (API) consumers to receive event data in near real-time. The API consumers may use a subscription API to define custom tags which the system applies to infrastructure assets to create custom subscription topics of event data. The subscription API may authorize access by a subscribing consumer to event data, apply custom tags defined by the customer to infrastructure assets, and return a description of infrastructure asset events associated with the custom tags to the customer on a subscription basis. Further, the computing system may update a live registry of infrastructure asset data based on changes to metadata describing the assets and automatically update the subscription topics of the API consumers to account for the changes.

The techniques may provide one or more technical advantages. For example, the data center infrastructure monitoring and messaging service described herein may enable customers, developers, Internet of Things (IoT) or other devices, and management systems to consume, in near real-time, event data including customized machine data feeds generated by one or more data center monitoring systems for globally distributed data centers having a large scale of infrastructure components that may be located in multiple regions and metropolitan areas. The techniques for customized tags, as described herein, may allow the customer to create rules that match certain criteria to customer tags that are then exposed using the subscription APIs. Such techniques may enable custom integration with customer dashboards and provide near real-time actionable information to API consumer and data center operators.

In one example, this disclosure describes a method including: monitoring, by a data center infrastructure monitoring system of a data center, a plurality of physical infrastructure assets that enable system operation within the data center for a plurality of events; applying, by the data center infrastructure monitoring system, one or more custom tags to the plurality of physical infrastructure assets, wherein each of the one or more custom tags is associated with a particular customer of the data center and specifies one or more attributes of the plurality of physical infrastructure assets; receiving, by the data center infrastructure monitoring system, a subscription request to event data for a topic to which the data center infrastructure monitoring system publishes event data for the plurality of physical infrastructure assets to which the one or more custom tags are applied; and publishing, by the data center infrastructure monitoring system and to a subscription application programming interface, the event data for the topic.

In another example, this disclosure describes a data center infrastructure monitoring system configured to: monitor a plurality of physical infrastructure assets that enable system operation within the data center for a plurality of events;

apply one or more custom tags to the plurality of physical infrastructure assets, wherein each of the one or more custom tags is associated with a particular customer of the data center and specifies one or more attributes of the plurality of physical infrastructure assets; receive a subscription request to event data for a topic to which the data center infrastructure monitoring system publishes event data for the plurality of physical infrastructure assets to which the one or more custom tags are applied; and publish, to a subscription application programming interface, the event data for the topic.

In another example, this disclosure describes a non-transitory computer-readable medium including instructions that, when executed, cause one or more processors executing a data center infrastructure monitoring system to: receive one or more custom tag rules, wherein a custom tag rule application programming interface defines the one or more custom tag rules in response to input from the customer, and wherein each of the one or more custom tag rules specifies a custom tag of the one or more custom tags and a rule for applying the custom tag to assets of the plurality of physical infrastructure assets; and apply, based on the one or more custom tag rules, the one or more custom tags to the plurality of physical infrastructure assets.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

FIGS. 8A-8B depict a flowchart illustrating an example operation in accordance with the techniques of the disclosure.

FIG. 15 is an illustration of an example graphical user interface for data center infrastructure management in accordance with the techniques of the disclosure.

Like reference characters denote like elements throughout the figures and text.

DETAILED DESCRIPTION

Figure 1:
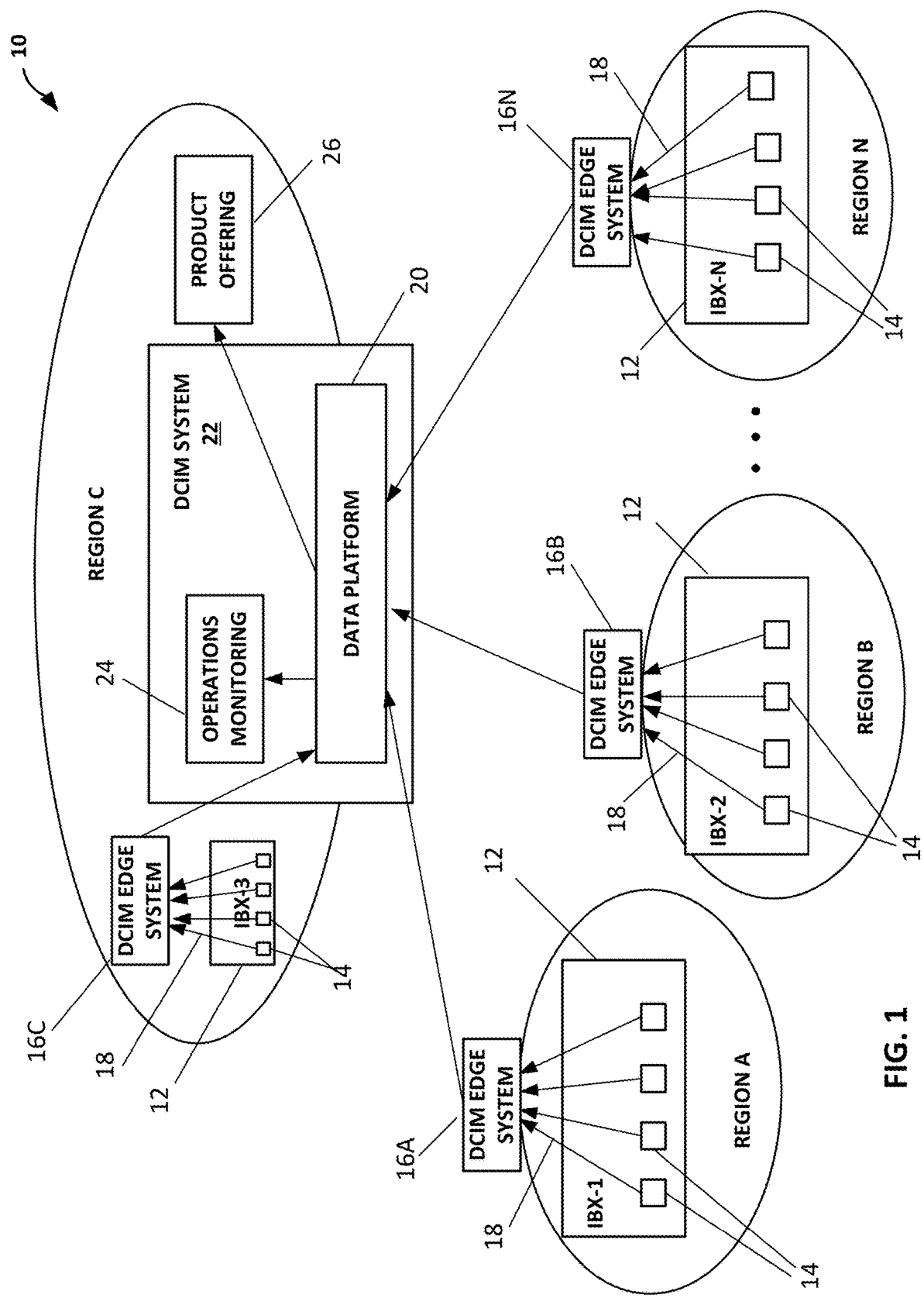
FIG. 1 is a block diagram illustrating an example system for data center infrastructure monitoring, in accordance with techniques described herein.

FIG. 1 is a block diagram illustrating an example system 10 for a data center infrastructure monitoring system, in accordance with techniques described herein. In the example of FIG. 1, system 10 includes multiple data centers 12 (also referred to herein as "co-location facilities" or "international business exchanges (IBX1-IBX-N)"), with each of the data centers 12 being located at one or more geographically distributed locations. For example, the data center infrastructure monitoring system 10 may include multiple data centers 12 located within a single region (e.g., country, continent) of regions A-N, or may include multiple data centers 12 located within multiple regions A-N.

Each of the multiple data centers 12 located within a given region A-N include multiple physical infrastructure assets 14 that enable operation of a physical building and IT systems located within the data center 12. For example, the assets 14 may include physical structure related to power systems and cooling systems associated with controlling the environment within the data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, assets 14 may include devices related to security, lighting, electrical, structural integrity, occupancy, or energy credits, for example. Each of the assets 14 are communicatively coupled to a corresponding one of data center infrastructure monitoring (DCIM) edge systems 16A-16N ("DCIM edge systems 16") via a connection 18. For example, each of the data centers 12 may communicate data associated with the assets 14 with the corresponding DCIM edge system 16 via one or more of a metro Ethernet network, the Internet, a mobile backhaul network, or a Multiprotocol Label Switching (MPLS) access network (not shown).

As shown in FIG. 1, respective DCIM edge systems 16 are located on different geographically distributed regions A-N. In some examples, a given region may have multiple DCIM edge systems 16 for multiple data centers 12 on the region, such as in different metropolitan areas, or multiple data centers in a metropolitan area. DCIM edge systems 16 may each be located within geographically distributed colocation facility provider facilities (not shown and hereinafter, "colocation facilities"), e.g., colocation data centers, each associated with (e.g., owned and/or operated by) a single colocation facility provider. The colocation service provider is a single entity, business, operator, service provider, or the like. In some examples, the colocation service provider operates an internet exchange, Ethernet exchange, and/or a cloud exchange, such as described in U.S. application Ser. No. 15/099,407, entitled CLOUD-BASED SERVICES EXCHANGE, filed Apr. 14, 2016, the entire contents of which are incorporated by reference herein.

The distributed colocation facilities in which the DCIM edge systems 16 are located may be connected by Wide Area Network (WAN). In this way, each of the DCIM edge systems 16 are connected to a data platform 20 within an operations/monitoring center 22 located within one of regions A-N, including being located within one of regions A-N having one or more data centers 12 co-located therein. Data associated with assets 14 from multiple data centers 12 is therefore received by the operation/monitoring center of a central DCIM system 22, and the data is then stored in a central platform for subsequent analysis and distribution by an operations monitoring infrastructure 24. In some examples, the data may be offered as part of a product offering 26, and/or utilized by one or more of the data centers 12 to monitor and control infrastructure and optimize ongoing operation of the one or more data centers 12, as described below in detail.

In some examples, DCIM edge systems 16 and DCIM system 22 may include components that function well offline without using a network to back them up, such as by using local storage for buffering messages that need to go across the network. In some examples, DCIM edge systems 16 and DCIM system 22 may employ a data platform to support real-time data streaming, data-in-transit to data-at-rest, which is reliable and robust to prevent data loss. In some examples, DCIM edge systems 16 and DCIM system 22 may include granular independent components designed to do one thing well.

DCIM system 22 may use a set of collaborating services (e.g., micro-services) organized around business capabilities. In some examples, DCIM edge systems 16 use infrastructure modeling (e.g., JSON-based) to standardize across machines and devices. DCIM edge systems 16 and DCIM system 22 may distribute and parallelize the processing of data from assets 14 across machines over the network.

Security features may be built in to system 10. For example, in some examples DCIM edge systems 16 and DCIM system 22 may include end-to-end trust points and countermeasures for each component in the ecosystem of system 10. In some examples, system 10 defines API contracts first using Domain Driven Design and exposes everything as a respective service. In some examples, DCIM edge systems 16 and DCIM system 22 may rely on container-based cloud native application development. In some examples, DCIM edge systems 16 and DCIM system 22 may use lightweight and platform-agnostic communication between the components and with each other using smart end points and light weight protocols. System 10 provides automation and continuous delivery and deployment to enable developers for seamless deployment and maintenance of assets 14 in system 10. Additional example description of a DCIM system is found in U.S. patent application Ser. No. 15/404,015, filed Nov. 11, 2017, and entitled, "Architecture for Data Center Infrastructure Monitoring," the entire contents of which is incorporated by reference herein.

In accordance with the techniques of the disclosure, DCIM system 22 provides access to data center event data for non-customer physical infrastructure assets 14 of data centers 12 via dynamically configurable custom tags defined by customers. For example, DCIM operations monitoring infrastructure 24 monitors non-customer physical infrastructure assets 14 that enable system operation within each data center 12 for events. DCIM system 22 implements an API which applies custom tags defined by customers to non-customer physical infrastructure assets 14, wherein each custom tag defines attributes of non-customer physical infrastructure assets 14. DCIM system 22 receives subscription requests that describe events and custom tags applied to non-customer physical infrastructure assets 14. DCIM system 22 publishes a subscription of event data related to the events for non-customer physical infrastructure assets 14 to which the custom tags are applied. The event data may include, for example, alarm data; alert data; tagpoints describing properties of infrastructure assets 14 such as HVAC (heating ventilation and air conditioning) units, computer room air conditioning units, power supplies, generators, power distribution units, and switchgears; power consumption data points; and environmental sensor data points.

The techniques may provide one or more of the technical advantages. For example, DCIM system 22 may enable customers, developers, Internet of Things (IoT) or other devices, and management systems to consume, in near real-time, event data including customized machine data feeds generated by one or more DCIM operations monitoring infrastructure 24 for globally distributed data centers 12 having a large scale of infrastructure components that may be located in multiple regions and metropolitan areas. The techniques for customized tags, as described herein, may allow the customer to create rules that match certain criteria to customer tags that are then exposed using the subscription APIs. Such techniques may enable custom integration with customer dashboards and provide near real-time actionable information to API consumer and data center operators.

Figure 2:
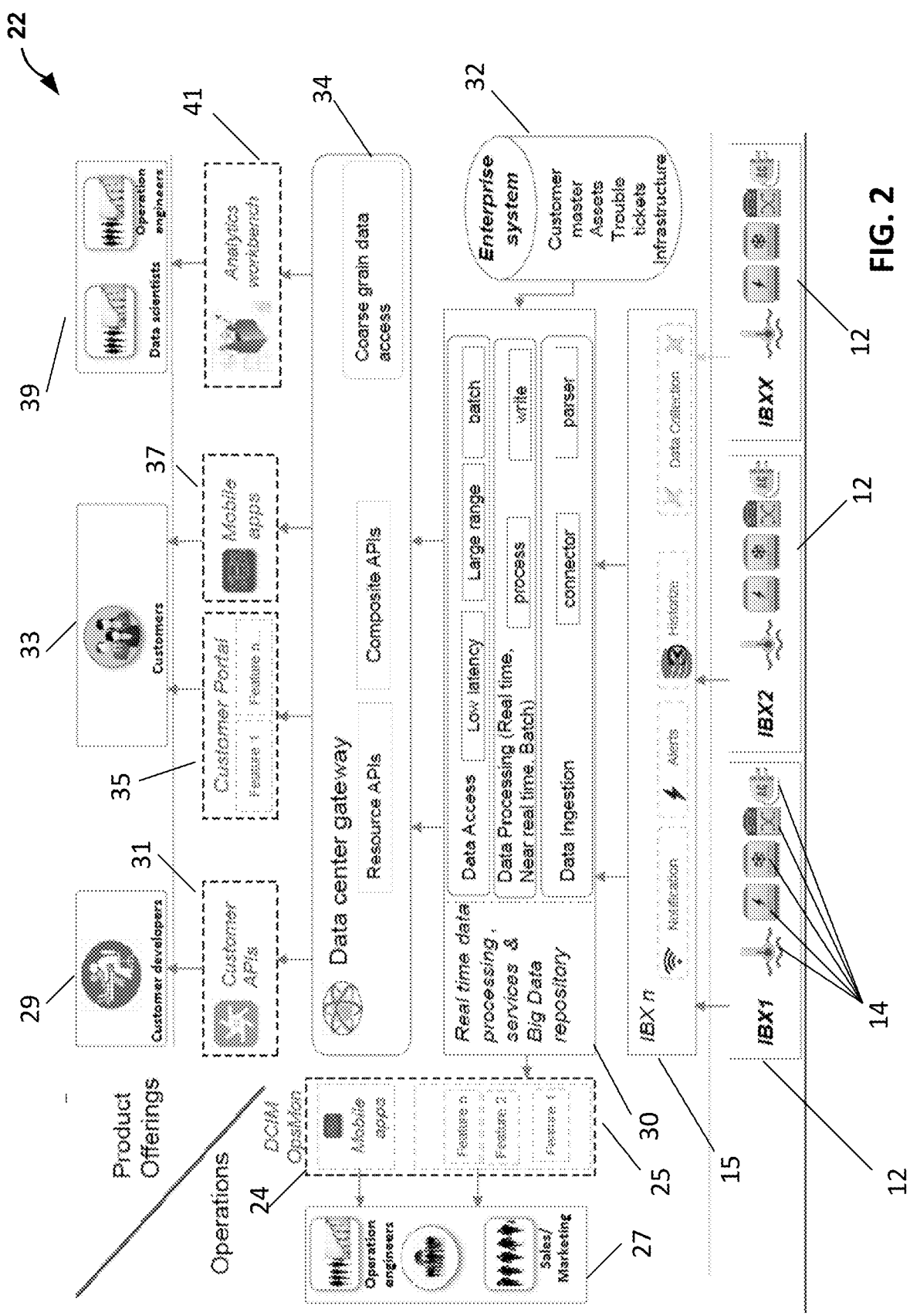
FIG. 2 is a block diagram illustrating an example data center infrastructure monitoring system, in accordance with techniques described herein.

FIG. 2 is a block diagram illustrating example reference architecture for a data center infrastructure monitoring system 22, in accordance with techniques described herein. The DCIM system 22 of FIG. 2 may correspond to DCIM system 22 and DCIM edge systems 16 of FIG. 1, for example. In the example of FIG. 2, the assets 14 included in the data centers 12 may include such data center infrastructure assets as temperature centers, power units, chillers, power usage and power switching, for example. The global DCIM system 10 includes a DCIM system 22 that gathers information related to the layer of assets 14 from multiple data centers 12, and stores the information within a data repository 30. The global information in data repository 30 is used to gather and create analytics for customers, business development and operations, using real-time end to end data collection, operational analytics, predictive analytics, data processing and services. In some examples, data monetization and what-if analysis utilizing data science algorithms may be performed using the global information. An enterprise system 32 is included to enable data centers 12 to notify DCIM system 22 when specific assets are non-operational, i.e., "offline", or experiencing operational disturbances. Enterprise system 32 may store data relating to one or more of customer master assets, trouble tickets, and infrastructure, for example.

A data center gateway 34 integrates with customer portal 35 and customer application programming interfaces (APIs) 31 to enable role based access control for users of cross-functional nature, such as operations, sales and customer roles, along with access governance and perimeter access controls for each system. Data center gateway 34 may provide resource APIs, composite APIs, and/or coarse grain data access, for example. The global information is used by the DCIM operations monitoring infrastructure 24 to develop certain features and mobile applications used by operation engineers and sales and marketing, including micro-services architecture driven feature based development of applications. The DCIM system 22 may provide authorization, access controls, audit trails, notification services, system health checks and integration.

In this way, information 15, such as notifications, alerts, and history associated with particular asset events, along with general asset data is received from multiple data centers 12 (IBX1-IBXX) and is collected within data repository 30. Data repository 30 processes the data in real-time, near real-time and/or in batches. The resulting processed multi-data center asset data is received by DCIM operations monitoring infrastructure 24, which transfers specific features 25 associated with the assets for internal operations 27 (e.g., internal to the co-location facility provider that operates data centers 12), including sales and marketing personnel and operations engineers, for example. In some examples, DCIM operations monitoring infrastructure 24 presents the data via mobile applications. In addition, the resulting asset data is received by customer developers 29 via customer APIs 31, and/or by specific customers 33 via customer portals 35 or mobile applications 37. The resulting data (e.g., coarse grain data) may also be accessed by data scientists and operations engineers 39 via an analytics workbench 41.

In accordance with the techniques of the disclosure, DCIM system 22 provides access to data center event data for non-customer physical infrastructure assets 14 of data centers 12 via dynamically configurable custom tags defined by customers. For example, DCIM operations monitoring infrastructure 24 monitors non-customer physical infrastructure assets 14 that enable system operation within each data center 12 for events. Data center gateway 34 provides an API which applies custom tags defined by customers to non-customer physical infrastructure assets 14, wherein each custom tag defines attributes of non-customer physical infrastructure assets 14. Data center gateway 34 receives subscription requests that describe events and custom tags applied to non-customer physical infrastructure assets 14. Data center gateway 34 publishes a subscription of event data related to the events for non-customer physical infrastructure assets 14 to which the custom tags are applied.

In one example, data center gateway 34 includes a feed manager that receives updates to non-customer physical infrastructure assets 14 and changes to metadata describing non-customer physical infrastructure assets 14 and automatically updates the subscription to account for the changes. In one example, the feed manager comprises a real-time processor that handles transactions pertaining to real-time feeds (e.g., for machine data and power consumption data). The feed manager internally maintains a live registry of custom tags associated to a publisher topic. The feed manager constantly updates the live registry based on changes in metadata defined by either subscription of a user or by custom tag rules. Such changes in metadata may include, for example, changes to custom rules or custom tags defined by customer. Such changes in metadata may further include changes in permissions of the customer. Accordingly, the system of the techniques disclosure herein provides an interface to make available to the customer real-time data feeds, which typically available are inaccessible to the customer. In some examples, the feed manager includes a single-queue sequential request processing engine that allows the feed manager to handle feed registrations by customer, the data center monitoring system may perform custom tag rule metadata changes and similar metadata changes in a data processing layer underneath a cache loader layer for the data center monitoring system.

In some examples, data center gateway 34 executes a messaging service that applies real-time processing to the events and publishes the processed events to custom topics of a publication platform to enable API consumers to receive the event data in near real-time. The API consumers may use a subscription API of data center gateway 34 to define custom tags which data center gateway 34 applies to non-customer physical infrastructure assets 14 to create custom subscription topics of event data. The subscription API may authorize access by a subscribing consumer to event data, apply custom tags defined by the customer to non-customer physical infrastructure assets 14, and return a description of infrastructure asset events associated with the custom tags to the customer on a subscription basis. Further, data center gateway 34 may update data repository 30 (e.g., a live registry of infrastructure asset data) based on changes to metadata describing non-customer physical infrastructure assets 14 and automatically update the subscription topics of the API consumers to account for the changes.

Figure 3:
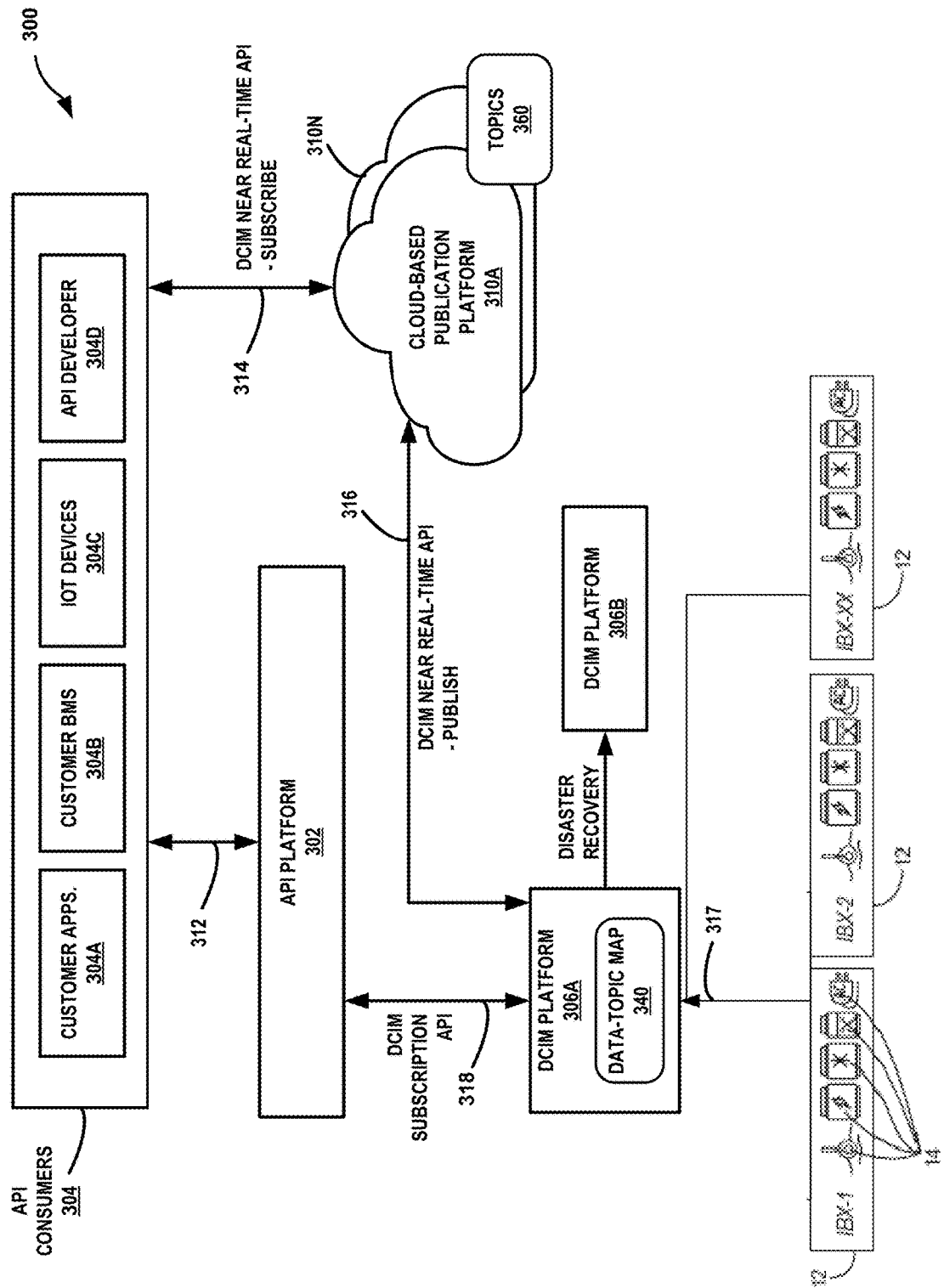
FIG. 3 is a block diagram illustrating an example system for a messaging service that applies real-time processing to data center events and publishes the processed events to custom topics of a publication platform in near real-time, according to techniques described herein.

FIG. 3 is a block diagram illustrating an example system for a messaging service that applies real-time processing to data center events and publishes the processed events to custom topics of a publication platform in near real-time, according to techniques described herein. Computing system 300 may represent an example of DCIM system 22 and other DCIM system architectures described in this disclosure. Computing system 300 includes an API platform 302, a primary data center infrastructure monitoring platform 306A, and in some examples a backup data center infrastructure monitoring platform 306B for disaster recovery. Computing system 300 receives registration requests for access to events (also referred to as "asset events" elsewhere in this disclosure) from API consumers 304, which may include customer applications 304A of customers of the data center provider, customer building management systems 304B for the customers, Internet of Things (IoT) devices 304C, and API developers 304D developing applications.

Computing system 300 includes an API platform 302 that executes one or more applications to route service requests, received via a communication network 312, for subscription API 314. API platform 302 may operate as an API gateway (or "service gateway"). That is, API platform 302 operates as a single point of entry for the one or more service instances of DCIM platform 306A applications and is responsible for service request routing to the service instances. API platform 302 routes service requests, such as registration requests from API consumers 304, received at the API platform 302 to target services offered by the one or more service instances of DCIM platform 306A applications. API platform 302 may represent one or more server computing devices and/or virtualized execution environments executing one or more API platform 302 applications and/or services. Although shown as a single element in FIG. 3, API platform 302 may execute on a cluster of one or more physical computing devices comprising one or more physical processors and/or virtualized execution environments executing on one or more physical processors.

DCIM platform 306A represents one or more applications each executing as one or more service instances to expose a subscription API 314 that includes methods for obtaining existing topics, registering new topics ("registration requests"), deleting topics, and updating topics, for example. In some examples, other methods may alternatively or additionally be used. DCIM platform 306A may receive asset events (or, more simply, "event data" or "events") from any of the examples of DCIM edge platforms 16 described elsewhere in this document that process real-time data produced by and for infrastructure assets to generate asset events.

API consumers 304 may issue registration requests to the API platform 302 that conform to the subscription API 314 to invoke the subscription API 314 methods, examples of which are described in detail below. That is, a registration request may indicate a method of the subscription API 314, and also specify one or more event subjects of events.

Using subscription API 314, DCIM platform 306A receives from API consumers 304 registration requests that each represents a request to register for a topic that provides access to near real-time data 317 generated by infrastructure assets of one or more data centers 12, here illustrated as International Business Exchanges (IBXes), IBX-1 through IBX-XX. A registration request may be an HTTP POST that invokes the subscribePost method one of the above examples from Table 3. Near real-time data 317 generated by infrastructure assets of one or more data centers 12 may include examples of data collected at one or more DCIM edges and provided to a data platform, as described above, with the data platform here being (or including) DCIM platform 306A to provide near real-time access to events that describe operations or conditions of infrastructure assets 14 of data centers 12.

Example event types may describe alarm statuses, alert statuses, tagpoint events that include values of infrastructure asset tagpoints, power events describing power consumption by infrastructure assets of the data centers, environmental data describing readings by environmental sensors, and resiliency information that indicates resiliency (e.g., availability of redundant assets, backup, etc.) for infrastructure assets. For instance, a data center 12 may generate a series of events that describe power consumption by a cabinet of the data center 12. As another example instance, a data center 12 may generate may generate a series of events that describe the temperatures determined by a temperature sensor (a type of environmental sensor) at a space within the data center 12.

Each of the events is associated with identifying information (an "event identifier") that uniquely identifies the event subject. Example event identifiers and event subjects include a unique alarm identifier for an alarm object, a unique alert identifier for an alert object, a unique tagpoint identifier for a tagpoint of an asset, an identifier for an infrastructure asset associated with power data, space and sensor identifiers associated with environmental data, and an identifier for an infrastructure asset having some resiliency status. Examples of such event identifiers are provided below in the example event object schemas. In some cases, DCIM platform 306A generates events using near real-time data 317 generated by data centers 12. In some cases, near real-time data 317 includes events. In either case, DCIM platform 306A obtains the events using near real-time data 317.

A registration request may specify a customer account, a data center, and a list of event subjects that correspond to near real-time data generated by the specified data center of data centers 12. Each event subject is a subject for one or more events that describe the event subject, and each event may correspond to a different event type describing the type of data for the event and the event subject. Example event subjects include alarm objects, alert objects, infrastructure assets, environmental sensors, and properties ("tagpoints") of infrastructure assets. Registration requests may include event identifiers that uniquely identify the event subject for events for which access is being requested. Data included in an event is referred to as "event data" and may indicate the type of event and include an object describing the event.

To provide access to the event data, DCIM platform 306A creates topics in one or more cloud-based publication platforms 310A-310N. Cloud-based publication platforms 310 each represents an asynchronous messaging system by which publishers create and send messages to topics. Consuming applications (or "subscribers") create subscriptions to topics in order to receive the messages sent to the topics. In this way, the computing system 300 provides a messaging service for API consumers 304 to receive DCIM event data in near real-time. Each of cloud-based publication platforms 310 represents applications executing on a computing architecture and, more particularly, executing on a public, private, or hybrid cloud computing architecture. Each computing architecture for a cloud-based publication platform 310 includes or one or more physical computing devices comprising one or more physical processors and/or virtualized execution environments executing on one or more physical processors.

Each cloud-based publication platform 310 offers a publish API 316 by which DCIM platform 306A registers new topics 360, stores the new topics in tag topic mapping database 442, and publishes messages to the topics 360 for consuming by topic subscribers. A topic 360 is a named resource to which messages are sent and to which a consuming application may subscribe to receive the messages. A topic 360 may be identified using a full or partial Uniform Resource Identifier (URI). A subscription is a named resource representing messages from a topic 360 and for delivery to a particular subscriber. A topic 360 can have multiple subscriptions, but a particular subscription is associated with and receives messages for a single topic. A subscription may operate according to a pull model in which the subscriber requests messages for the topic 360, or according to a push model in which the cloud-based publication platform 310 initiates requests to the subscriber to deliver messages for the topic 360. A subscription may be identified using a full or partial URI.

In response to receiving a registration request conforming to subscription API 314, DCIM platform 306A processes the registration request and sends, to a selected one of cloud-based publication platforms 310 using the corresponding publish API 316, a topic request to request a new topic for the list of events specified in the registration request and generated by the specified data center 12. The selected cloud-based publication platform 310 creates the topic in topics 360 and returns a description of the topic to the DCIM platform 306A in response to the topic request. The description of the topic may include a subscription identifier usable for creating a subscription to the topic. The subscription identifier may be a full or partial URI, a string, an integer, etc. In some instances, the description of the topic may include subscription details. The subscription details may include data describing a subscription created by the DCIM platform 306A on behalf of the requesting API consumer 304, and usable by the API consumer 304 for obtaining near real-time events describing operations of a data center 12. In some instances, the registration request may specify the cloud-based publication platform 310 to be selected and used by the DCIM platform 306A for publishing event data according to the registration request. DCIM platform 306A returns the subscription identifier in a registration response to the API consumer 304 that issued the registration request, in response to successful registration of the topic.

DCIM platform 306A also creates mappings from each of the event subjects indicated in the registration requested to the new topic of topics 360, and stores the mappings to data-topic map 340. For example, a registration request may indicate two event subjects, an alarm and a tagpoint, each having a unique event identifier. After receiving the new topic from the selected cloud-based publication platform 310, DCIM platform 306A creates a mapping for each of the event subjects to the topic and stores the two mappings to data-topic map 340. If data-topic map 340 includes an existing mapping for an event subject, DCIM platform 306A may add the topic to an existing list of one or more topics for the existing mapping. Thus, each mapping or entry in data-topic map 340 is a one-to-many association of an event subject to one or more topics for publishing events relating to the event subject. Data-topic map 340 may further include a description of the subscribed events. Data-topic map 340 may represent an associative data structure, such as a map, a table, a list of tuples, and a hash map. The event identifier for an event subject may operate as a lookup key to a corresponding entry in data-topic map 340, such entry mapping the event identifier/lookup key to one or more topics 360 for the event subject. Data-topic map 340 may represent a hash table, with mappings stored to hash buckets and hashes of event identifiers used as the lookup key. Example hash functions include SHA-1 and MD5.

DCIM platform 306A subsequently obtains events using near real-time data 317 from data centers 12. DCIM platform 306A queries data-topic map 340 using the event identifier for each event to quickly determine whether the event subject has a corresponding one or more topics in any of cloud-based publication platforms 310. If so, DCIM platform 306A obtains the one or more topics for the event subject and publishes the event to the topic by sending a publication message, using publish APIs 316, that includes the event data for the event to the resource for the topic. As used herein, "resource" may refer to a resource accessible at a particular URI.

As noted above, API consumers 304 receive subscription identifiers in registration responses from DCIM platform 306A, the subscription identifiers being usable for subscribing to corresponding topics 360 of cloud-based publication platforms 310. Cloud-based publication platforms 310 provide corresponding subscribe APIs 314 for subscribing to topics 360 to obtain events published to the topics 360 by DCIM platform 306A.

API consumers 304 request subscriptions to topics 360 by identifying the desired topics 360 using subscription identifiers provided by DCIM platform 306A. Using the subscriptions, API consumers 304 request messages that include the events published to the topics 360 by DCIM platform 306A. In this way, API consumers 304 may obtain event data that describes operations and conditions of data centers 12 and that is published in near real-time by DCIM platform 306A to provide infrastructure asset updates to API consumers 304.

In some examples, computing system 300 uses Server-side Events (SSE) for event publication rather than cloud-based publication platforms 310. In such examples, an API consumer 304 subscribes to an SSE platform to obtain real-time notifications of events. The SSE platform provides a REST API for fetching event data. When DCIM platform 306A receives a new event, DCIM platform 306A publishes the new event to a topic for the SSE platform and notifies the API consumer 304 of the availability of new event. The API consumer 304 may then use the REST API to fetch the new event.

Computing system 300 may include backup DCIM platform 306B in some examples for disaster recovery. DCIM platform 306B may be similar to DCIM platform 306A but located elsewhere for geographic redundancy. DCIM platform 306A may replicate data-topic map 340 to DCIM platform 306B, which may assume and perform event publication in the event of a failure of DCIM platform 306A. Further detail regarding a messaging service that applies real-time processing to data center events and publishes the processed events to custom topics of a publication platform is described in U.S. Provisional App. No. 62/517,464 to Rangasamy, entitled "NEAR REAL-TIME MESSAGING SERVICE FOR DATA CENTER INFRASTRUCTURE MONITORING DATA" and filed on Jun. 9, 2017, the entire content of which is incorporated herein.

In accordance with the techniques of the disclosure, computing system 300 provides access to near real-time data 317 for non-customer physical infrastructure assets 14 of data centers 12 via dynamically configurable custom tags defined by customers. For example, DCIM platform 306A monitors non-customer physical infrastructure assets 14 that enable system operation within each data center 12 for events. DCIM platform 306A provides an API which applies custom tags defined by customers to non-customer physical infrastructure assets 14, wherein each custom tag defines attributes of non-customer physical infrastructure assets 14. DCIM platform 306A receives, via DCIM subscription API 314, subscription requests that describe events and custom tags applied to non-customer physical infrastructure assets 14. DCIM platform 306A publishes, via DCIM subscription API 314, a subscription of event data related to the events for non-customer physical infrastructure assets 14 to which the custom tags are applied.

Figure 4:
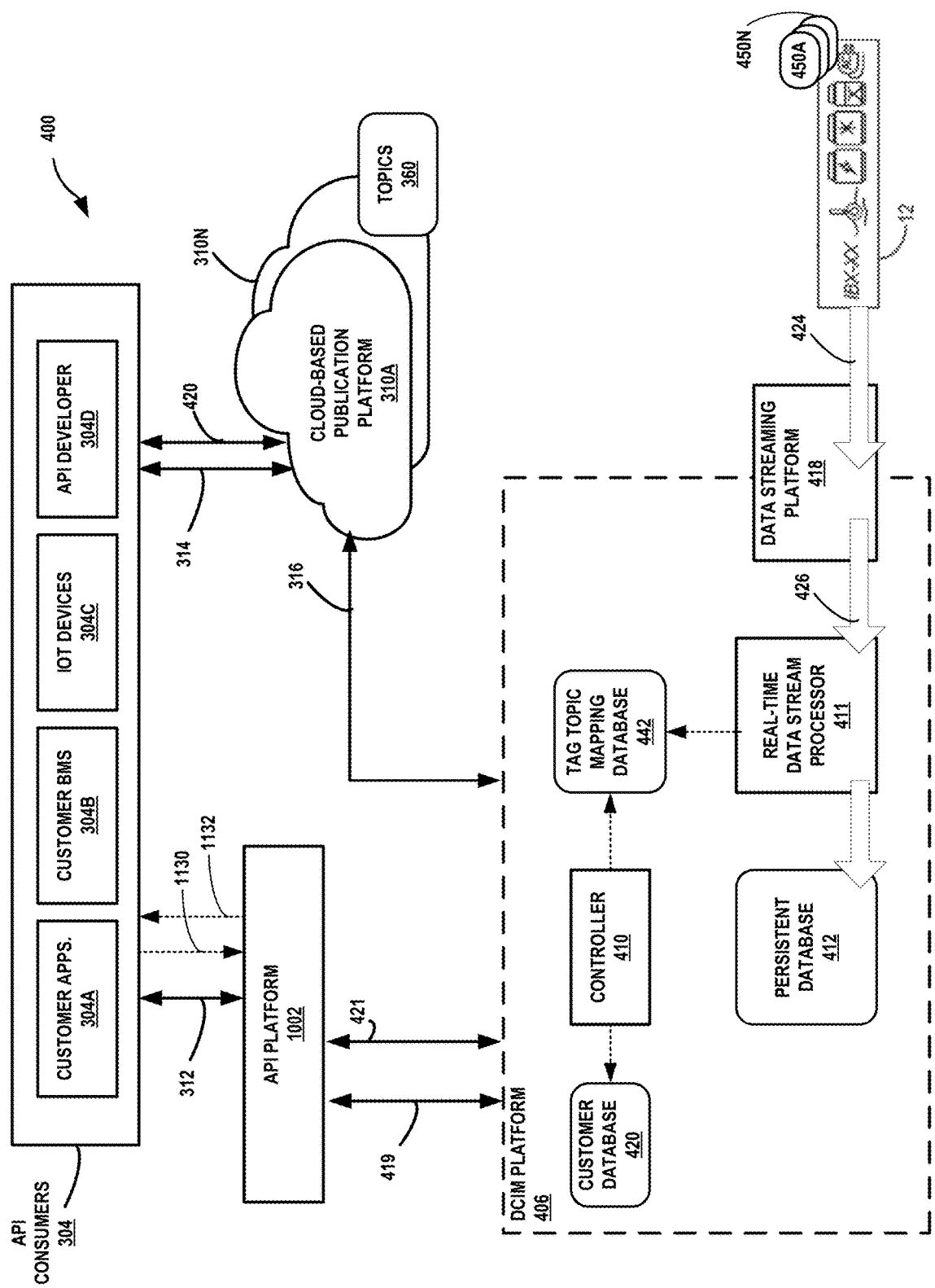
FIG. 4 is a block diagram illustrating an example system for a messaging service that applies real-time processing to data center events and publishes the processed events to custom topics of a publication platform in near real-time, according to techniques described herein.

FIG. 4 is a block diagram illustrating an example system for a messaging service that applies real-time processing to data center events and publishes the processed events to custom topics of a publication platform in near real-time, according to techniques described herein. Computing system 400 includes an API platform 302 and a primary data center infrastructure monitoring (DCIM) platform 406. DCIM platform 406 illustrates, in detail, an example implementation of primary DCIM platform 306A.

DCIM platform 406 includes data streaming platform 418, real-time data stream processor 411, and controller 410. Each of data streaming platform 418, real-time data stream processor 411, and controller 410 may represent one or more server computing devices and/or virtualized execution environments executing one or more API platform 302 applications and/or services. Although shown as single elements, each of data streaming platform 418, real-time data stream processor 411, and controller 410 may execute on a cluster of one or more physical computing devices comprising one or more physical processors and/or virtualized execution environments executing on one or more physical processors.

Data streaming platform 418 receives real-time data 424 generated by data center 12 and creates data streams 426. Data streaming platform 418 may represent an Apache Kafka instance(s), for example.

Controller 410 processes subscription API 314 service requests originated by API consumers 304. Controller 410 authorizes and processes such service requests to responsively create/modify topics 360 and generate/modify entries of data-topic map 340. Controller 410 may store data-topic map 340 to a memory of a computing device that executes one or more service instances of a controller 410 application.

Controller 410 further processes service requests originated by custom tag rule API 419, custom tag API 420, and reconciliation API 421. APIs 419-421 are described in further detail below.

In accordance with the techniques of the disclosure, tags present on customer visible assets 14 or otherwise, which are not marked as customer-visible tags, may be exposed to specific customers as customer-defined tags 450A-450N (hereinafter, "custom tags 450" or "custom asset tags 450"). In the example of FIG. 4, asset tag information is not directly exposed to the customer, but is made visible by providing custom tag API 420, to which the customer may interface to create custom tags 450 to be applied to non-customer physical infrastructure assets. Custom tag API 420 may not expose to a customer asset tag information that otherwise would not be visible to the customer through existing dashboard user interfaces. Customers may create additional metadata in infrastructure databases and use custom tag API 420 to access the information. Asset tags exposed using this newly created metadata are referred to as "custom tags." Custom tags 450 may describe any electrical or mechanical assets 14 in datacenter 12, or characteristic of such assets 14. Custom tags 450 (e.g., custom asset tags) include, for example, a geographic location of data center 12, a certain IBX number, a customer ID, an asset ID, tag names, or a text string provided by a customer associated with the subscription. As contemplated herein, the customer may access Custom tags 450 only via custom tag API 420 and real-time feeds provided by subscription API 314. DCIM platform 406 additionally provides custom tag rule API 419 which allows a customer to set up custom rules for custom tags 450 having custom visibility. The custom rules allow the customer to expose tags that match a certain criteria using custom tag rule API 419. Each custom tag rule includes one or more custom tags and criteria for matching physical infrastructure assets 14 with the one or more custom tags. Using custom tag rule API 419, a customer may create rules that match certain metadata criteria to custom tags 450 exposed using custom tag API 420.

Custom tag API 420 creates and saves transforms (e.g., actual tags or custom tags 450) that are derived after applying the criteria defined by custom rules generated by custom tag rule API 419. Further, custom tag API 420 may update custom tags data, assets hierarchy (e.g., data center components metadata), after receiving metadata changes that may impact customer asset linkage.

In some examples, DCIM platform 406 includes reconciliation API 421 for reconciling changes related to subscriptions or custom tags to the live registry of feed data. In some examples, DCIM platform 406 provides an interface, such as a graphical user interface (GUI), to a user. The user may use the interface to access reconciliation API 421 update custom tags and/or custom rules. Reconciliation API 421 publishes such changes in rules, tags, and/or metadata to DCIM platform 406. DCIM platform 406 may further apply such new or updated rules to subscription messages sent to users. In some examples, reconciliation API 421 further includes a history table change for persisting older versions.

Real-time data stream processor 411 obtains data streams 426 generated by data streaming platform 418 and publishes events from the data streams 426 to topics 360 cloud-based publication platforms 410 based on mappings stored to data-topic map 340. Real-time data stream processor 411 may store data streams 426 to a persistent database 412. Persistent database 412 may represent a Cassandra database instance, for example. Real-time data stream processor 411 may represent an Apache Storm instance(s), for example.

Figure 5:
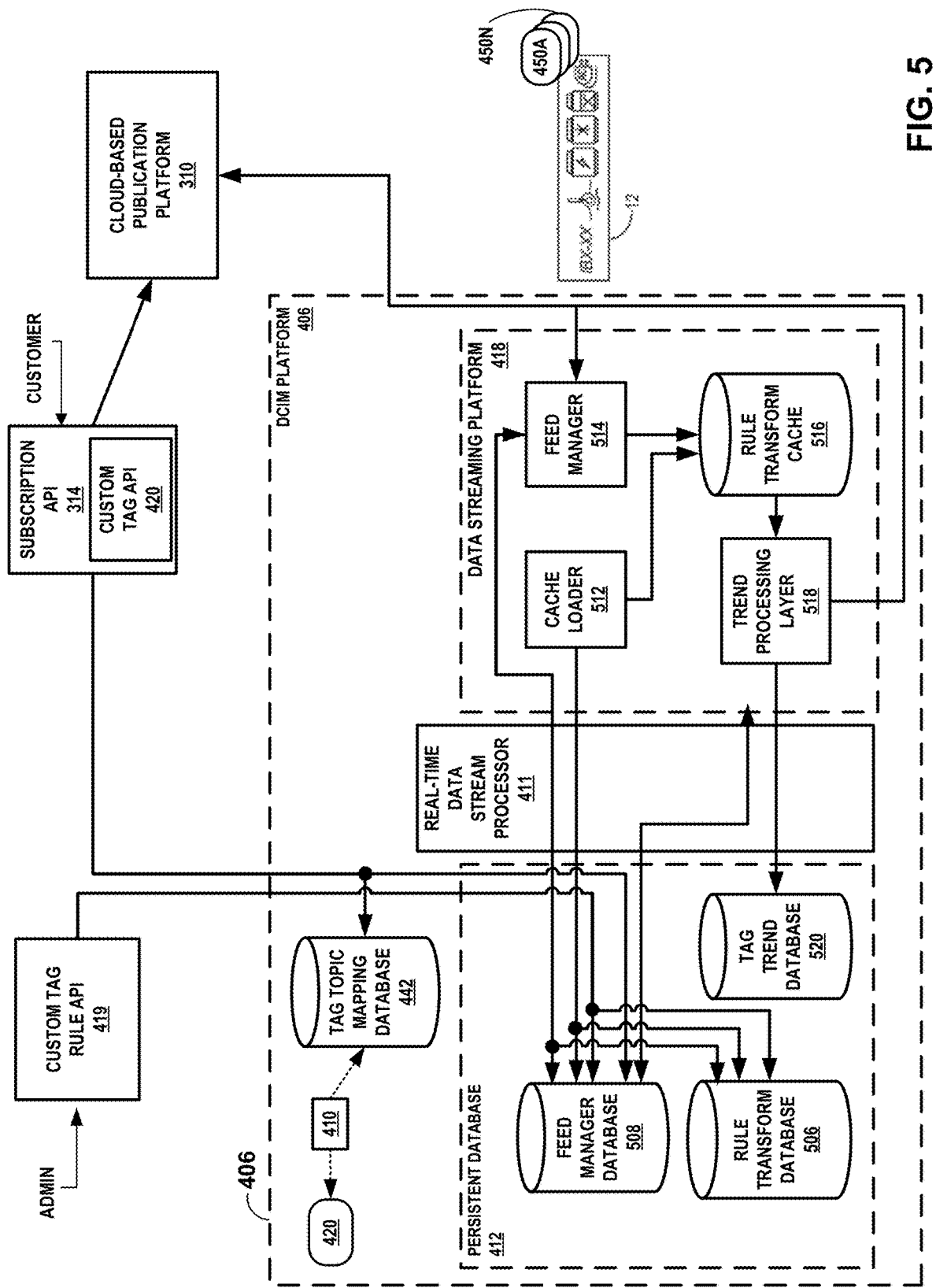
FIG. 5 is a block diagram illustrating the DCIM platform of FIG. 4 in further detail.

FIG. 5 is a block diagram illustrating DCIM platform 406 of FIG. 4 in further detail. In the example DCIM platform 406 of FIG. 5, persistent database 412 further includes a feed manager database 508, a rule transform database 506, and a tag trend database 520. Data streaming platform 418 further includes cache loader 512, feed manager 514, rule transform cache 516, and trend processing layer 518. DCIM platform 406 interfaces with custom tag rule API 419 and subscription API 314 to generate subscriptions for event data for non-customer physical infrastructure assets 12 tagged with custom tags 450.

In the example of FIG. 5, subscription API 314 receives a registration from a user for one or more data feeds. Subscription API 314 stores registration data for the user in a registration database (e.g., such as a collection in a Mongo database). Subscription API 314 receives, from a provider cloud and based on the registration data, a topic and a subscription for the user. Subscription API 314 streams successful registration requests to feed manager database 508 for use by feed manager 514.

In one example, feed manager 514 is implemented as a single executor, single worker process. In this example, feed manager 514 serializes tag update requests before batching and processing the requests for updating tag mapping database 442. In some examples, feed manager 514 receives messages from subscription API 314 and/or a custom tag API 420. These messages may include specific flags to uniquely identify them from generic messages. In some examples, feed manager 514 pushes changes related to tag topic mapping using a current tick tuple message solution used for refreshing tag data. In some examples, feed manager 514 uses a database table for mirroring data for tag topic mapping as a backing table.

Custom tag rule API 419 allows an administrator to update tag rule data via a user interface (e.g., such as by updating crud rules). Custom tag rule API 419 stores updated tag rule data in a tag rule database (e.g., such as within tables of an Oracle database). Custom tag rule API 419 streams successfully updated tag rules to the feed manager database for use by the feed manager.

Cache loader 512 executes basic events received from the feed manager database. Cache loader 512 updates asset data in the tag rule database. Further, cache loader 512 updates asset and tag data in the feed manager database. Cache loader 512 is further configured to generate messages to flush local cached data and reconcile tag topic mapping data streamed to the feed manager database.

Feed manager 514 is configured to read infrastructure event data from feed manager database 508 (e.g., such as a Kafka database). Further, as described above, feed manager 514 receives subscription information from feed manager database 508 and rule transform database 506. Feed manager 514 further updates tag topic mapping to feed manager database 508 and rule transform database 506. Further, feed manager 514 is configured to generate messages to flush local tag topic mapping data streamed to rule transform cache 516.

In some examples, the data processing layer publishes infrastructure information asynchronously to an endpoint specified by feed manager 514. The data processing layer receives, from feed manager 514, updates to metadata related to asset tags. In further examples, the data processing layer updates a local cache with tag topic mapping specified by the received metadata.

In some examples, each time feed manager 514 receives a feed that contains a subscription identifier (ID), a unique customer mapping (UCM) ID, and/or a tag ID, feed manager 514 enters the changes described by the feed in a DCIM tag feeds table for reconciliation. In some examples, feed manager 514 stores the changes in tag mapping database 442 to allow the data processing layer to push real-time data to the cloud.

In accordance with the techniques of the disclosure, DCIM platform 406 provides access to near real-time data 317 for non-customer physical infrastructure assets 14 of data centers 12 via dynamically configurable custom tags 450 defined by customers. For example, DCIM platform 306A monitors non-customer physical infrastructure assets 14 that enable system operation within each data center 12 for events. DCIM platform 306A provides an API which applies custom tags defined by customers to non-customer physical infrastructure assets 14, wherein each custom tag defines attributes of non-customer physical infrastructure assets 14. DCIM platform 306A receives, via DCIM subscription API 314, subscription requests that describe events and custom tags applied to non-customer physical infrastructure assets 14. DCIM platform 306A publishes, via DCIM subscription API 314, a subscription of event data related to the events for non-customer physical infrastructure assets 14 to which the custom tags are applied.

In one example, feed manager 514 receives updates to non-customer physical infrastructure assets 14 and changes to metadata describing non-customer physical infrastructure assets 14 and automatically updates the subscription to account for the changes. In one example, feed manager 514 comprises real-time data stream processor 411 that handles transactions pertaining to real-time feeds (e.g., for machine data and power consumption data) from infrastructure assets 14. Feed manager 514 internally maintains a live registry of custom tags associated to a publisher topic. Feed manager 514 constantly updates the live registry based on changes in metadata defined by either subscription of a user or by custom tag rules. Such changes in metadata may include, for example, changes to custom rules or custom tags defined by customer. Such changes in metadata may further include changes in permissions of the customer. Accordingly, the system of the techniques disclosure herein provides an interface to make available to the customer real-time data feeds, which typically available are inaccessible to the customer. In some examples, feed manager 514 includes a single-queue sequential request processing engine that allows the Feed manager 514 to handle feed registrations by customer. Further, feed manager 514 may perform custom tag rule metadata changes and similar metadata changes in a data processing layer underneath a cache loader layer for DCIM platform 406.

In some examples, feed manager 514 executes a messaging service that applies real-time processing to the events and publishes the processed events to custom topics of cloud publication platform 310 to enable API consumers to receive the event data in near real-time. In some examples, subscription API 314 includes custom tag API 420. The API consumers may use custom tag API 320 to define custom tags which DCIM platform 406 applies to non-customer physical infrastructure assets 14 to create custom subscription topics of event data. Subscription API 314 may authorize access by a subscribing consumer to event data, apply custom tags defined by the customer to non-customer physical infrastructure assets 14 (e.g., via custom tag API 420), and return a description of infrastructure asset events associated with the custom tags to the customer on a subscription basis. Further, DCIM platform 406 may update persistent database 412 (e.g., a live registry of infrastructure asset data) based on changes to metadata describing non-customer physical infrastructure assets 14 and automatically update the subscription topics of the API consumers to account for the changes.

Figure 6:
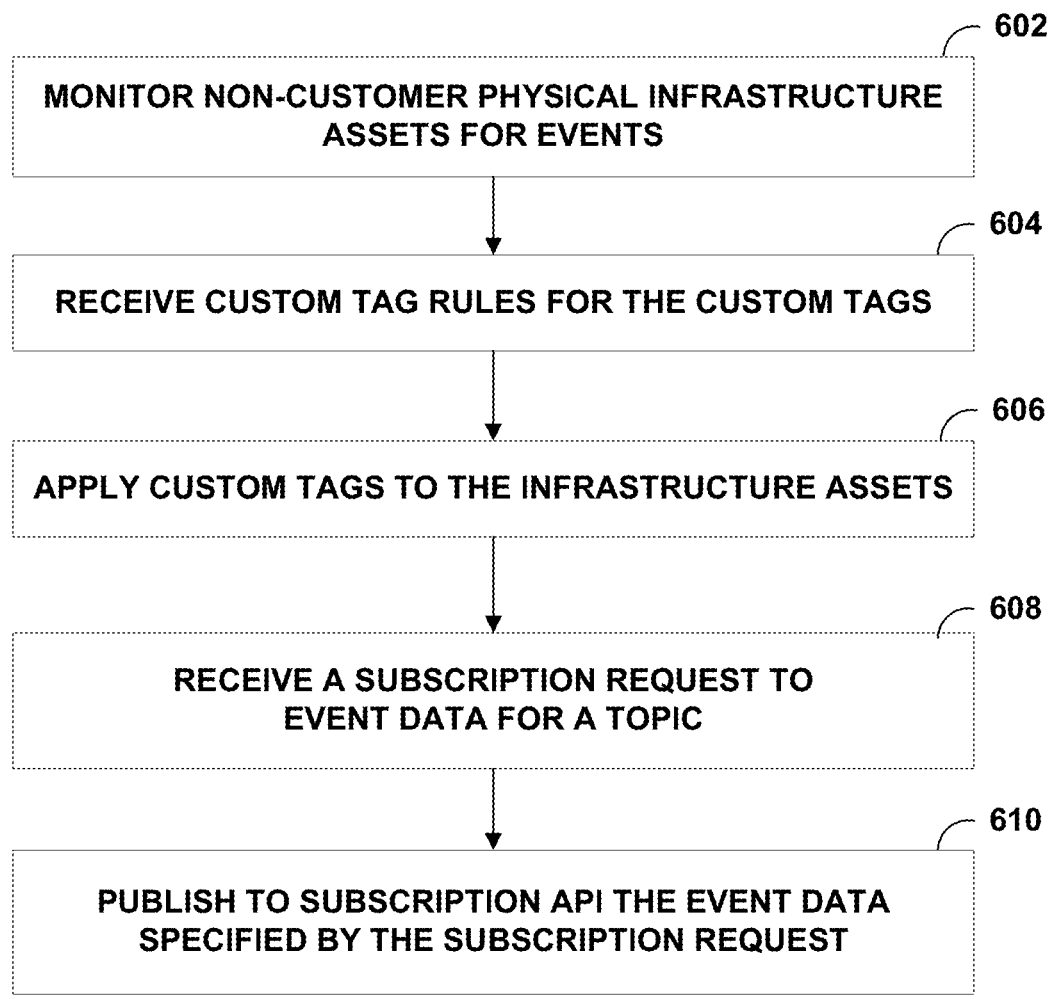
FIG. 6 is a flowchart illustrating an example mode of operation for computing system to apply real-time processing to data center events and publish the processed events to custom topics of a publication platform in near real-time, according to techniques described herein.

FIG. 6 is a flowchart illustrating an example mode of operation for computing system 400 to apply real-time processing to data center events and publish the processed events to custom topics of a publication platform in near real-time, according to techniques described herein. For convenience, FIG. 6 is described with respect to FIG. 4.

In one example, DCIM platform 406 of data center 12 monitors a plurality of non-customer physical infrastructure assets 14 for a plurality of events (602). The plurality of non-customer physical infrastructure assets 14 enable system operation within the data center. In some examples, the plurality of non-customer physical infrastructure assets 14 include physical structure related to power systems and cooling systems associated with controlling the environment within the data center 12, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, assets 14 may include devices related to security, lighting, electrical, structural integrity, occupancy, or energy credits, for example. Example event types may describe alarm statuses, alert statuses, tagpoint events that include values of infrastructure asset tagpoints, power events describing power consumption by infrastructure assets of the data centers, environmental data describing readings by environmental sensors, and resiliency information that indicates resiliency (e.g., availability of redundant assets, backup, etc.) for infrastructure assets.

DCIM platform 406 receives, from custom tag API 420, one or more custom tags 450 for application to the plurality of non-customer physical infrastructure assets 14. In some examples, each of the one or more custom tags 450 defines one or more attributes of the plurality of non-customer physical infrastructure assets 14. For example, custom tags 450 may describe any electrical or mechanical assets 14 in datacenter 12, or characteristic of such assets 14. Custom tags 450 (e.g., custom asset tags) include, for example, a certain IBX number, a customer ID, an asset ID, or tag names. In further examples, a customer of data center uses custom tag API 420 to define each custom tag 450.

Further, DCIM platform 406 receives, from custom tag rule API 419, one or more custom tag rules (604). In some examples, custom tag rule API 419 defines the one or more custom tag rules in response to input from the customer. In further examples, each of the one or more custom tag rules specifies a custom tag of the one or more custom tags and a rule for applying the custom tags to assets of the plurality of non-customer physical infrastructure assets 14. Based on the one or more custom tag rules, DCIM platform 406 applies the one or more custom tags 450 to the plurality of non-customer physical infrastructure assets 14 (606).

DCIM platform 406 receives, from subscription API 314, a subscription request to event data for a topic to which DCIM platform 406 publishes event data for the plurality of physical infrastructure assets 14 to which the one or more custom tags are applied (608). The event data may include, for example, alarm data; alert data; tagpoints describing properties of infrastructure assets such as HVAC (heating ventilation and air conditioning) units, computer room air conditioning units, power supplies, generators, power distribution units, and switchgears; power consumption data points; and environmental sensor data points. In some examples, the subscription request describes one or more events of the plurality of events. In further examples, the subscription request specifies one or more topics to which DCIM platform publishes event data. In some examples, the topic includes event data for the plurality of non-customer physical infrastructure assets to which the one or more custom tags are applied.

DCIM platform 406 retrieves event data for the topic specified by the subscription request (e.g., event data for the plurality of non-customer physical infrastructure assets to which the custom tags are applied). DCIM platform 406 publishes, to subscription API 314, the event data for the topic (610).

Figure 7A:
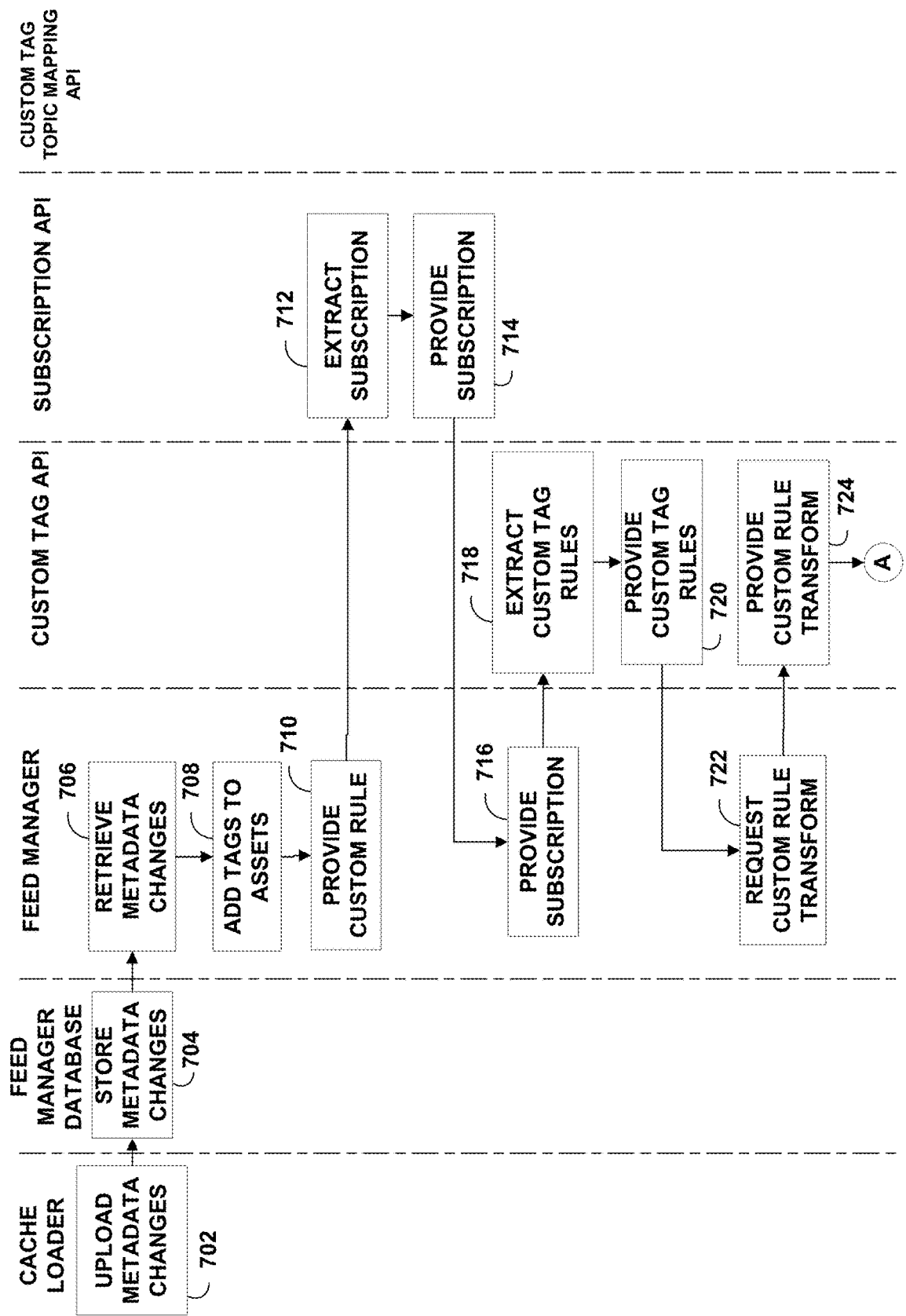
FIGS. 7A-7B depict a flowchart illustrating an example operation in accordance with the techniques of the disclosure.
Figure 7B:
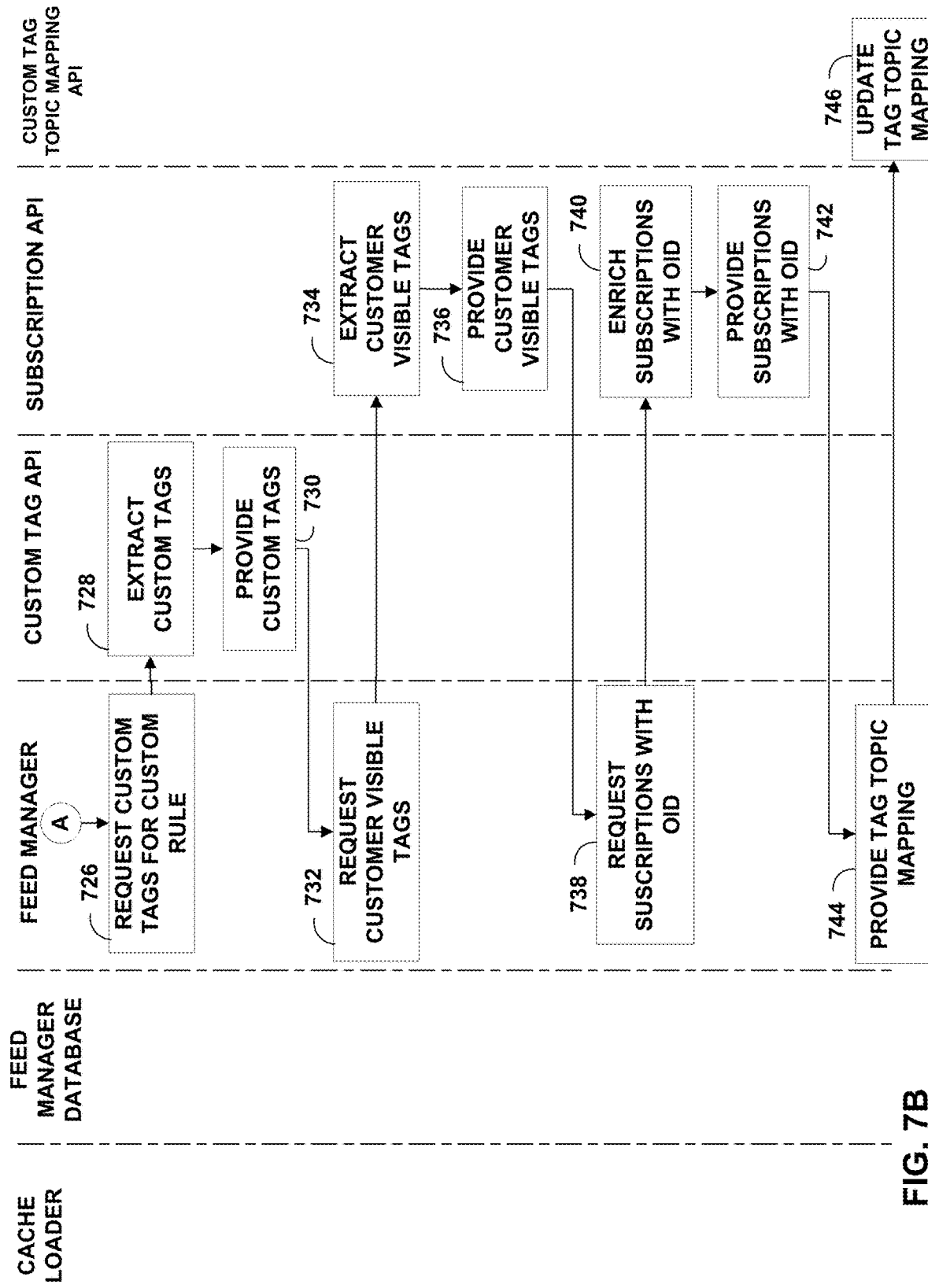

FIGS. 7A-7B depict a flowchart illustrating an example operation in accordance with the techniques of the disclosure. Specifically, the example of FIGS. 7A-7B illustrates an operation for cache loader changes including metadata related to asset tags. For convenience, FIGS. 7A-7B are described with respect to FIG. 5.

In the example of FIG. 7A, cache loader 512 forwards asset tags including metadata changes to feed manager database 508 (e.g., such as a Kafka database) (702). Feed manager database 508 stores the data (704) and forwards the asset tag data to feed manager 514. Feed manager 514 receives the data (706) and adds the tag metadata to its live registry and applies the tag metadata to current tags (708). Feed manager 514 provides one or more custom rules to subscription API 314 (710). Subscription API 314 extracts subscriptions from one or more custom tag rules (712) and provides the subscriptions for one or more custom tag rules to feed manager 514 (714).

Feed manager 514 provides the subscription to custom tag API 419 (716), which extracts one or more custom tag rules from the one or more subscriptions (718) and provides the custom tag rules to feed manager 514 (720). Further, feed manager 514 requests, from custom tag API 419, a change log of custom rule transforms (722). Custom tag API 419 provides, based on the asset metadata, custom rule transforms for the assets (724).

With respect to FIG. 7B, feed manager 514 requests, from custom tag API 419, a change log of custom tags for the custom rule transforms (726). The change logs capture created and deleted changes in transforms and results in a reduced number of changes to tag topic mapping database 442. Custom tag API 419 extracts, from the custom rule transforms, the change log of custom tags (728) and provides the change log of custom tags to feed manager 514 (730).

Feed manager 514 requests customer-visible tags for the subscription from subscription API 314 (732). Subscription API 314 extracts customer-visible tags for each customer (734) and provides the customer-visible tags to geed manager 514 (736).

Feed manager 514 requests, from subscription API 314, subscriptions with object identifier (OID) information for objects represented in a management information base (738). Subscription API 314 enriches the subscriptions with OID information (740) and provides the subscriptions with OID information to feed manager 514 (742).

Further, Feed manager 514 provides the tag topic mapping relationships to tag topic mapping database 442 (744) which stores the updated tag topic mapping relationships (746). In some examples, Feed manager 514 also updates feed manager database 508 for both custom tags and customer-visible tags.

Figure 8A:
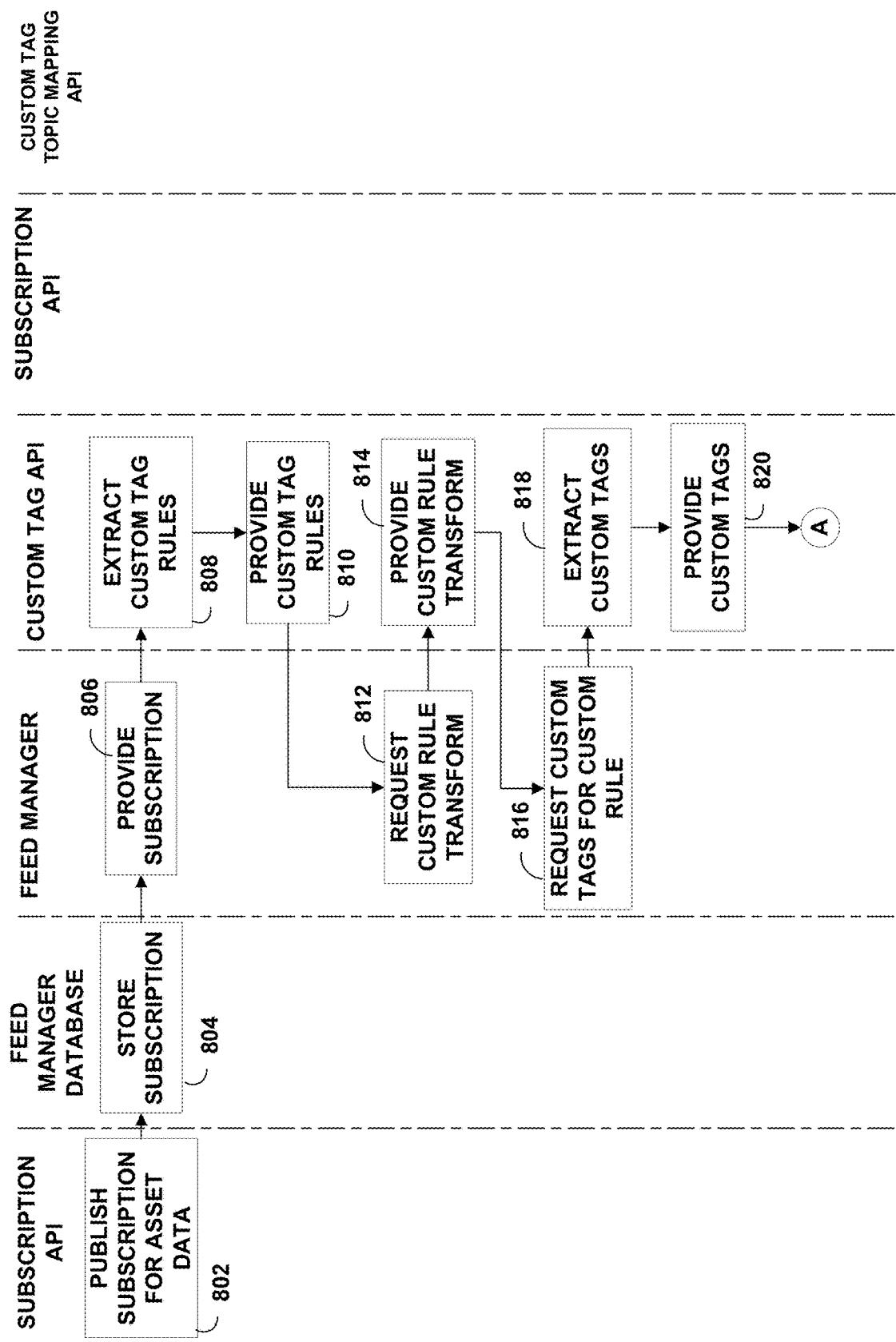

FIGS. 8A-8B depict a flowchart illustrating an example operation in accordance with the techniques of the disclosure. Specifically, the example of FIGS. 8A-8B illustrates an operation for performing a subscription to real-time feeds data changes. For convenience, FIGS. 8A-8B are described with respect to FIG. 5.

In one example, subscription API 314 creates a subscription for asset data and publishes the asset data to feed manager database 508 (802). Feed manager database 508 stores the subscription (804) and provides this information to feed manager 514 (806). Feed manager 514, provides the subscription to custom tag API 120. Custom tag API 420 extracts custom tag rules from the subscription (808) and provides the custom tag rules to feed manager 514 (810). Further, feed manager 514 requests from custom tag API 420 custom rule transforms for the received custom tag rules (812). Custom tag API 420 extracts custom tag rule transforms from the custom tag rules and provides the custom rule transforms to feed manager 514 (814). Feed manager 514 requests from custom tag API 420 custom tags for the received custom tag rule transforms (816). Custom tag API 420 extracts custom tags from the custom tag rule transforms (818) and provides the custom tags to feed manager 514 (820).

Further, feed manager 514 requests, from subscription API 314, customer-visible tags for the custom tags for the subscription (822). Subscription API 314 extracts customer-visible tags for each customer from the custom tags (824) and provides the customer-visible tags to feed manager 514 (826).

Feed manager 514 requests, from subscription API 314, subscriptions with OID information (828). Subscription API 314 enriches the subscriptions with OID information (830) and provides the subscriptions with OID information to feed manager 514 (832).

Further, feed manager 514 provides the tag topic mapping relationships to tag topic mapping database 442 (834) which stores the updated tag topic mapping relationships (836). In some examples, Feed manager 514 also updates feed manager database 508 for both custom tags and customer-visible tags.

Figure 9A:
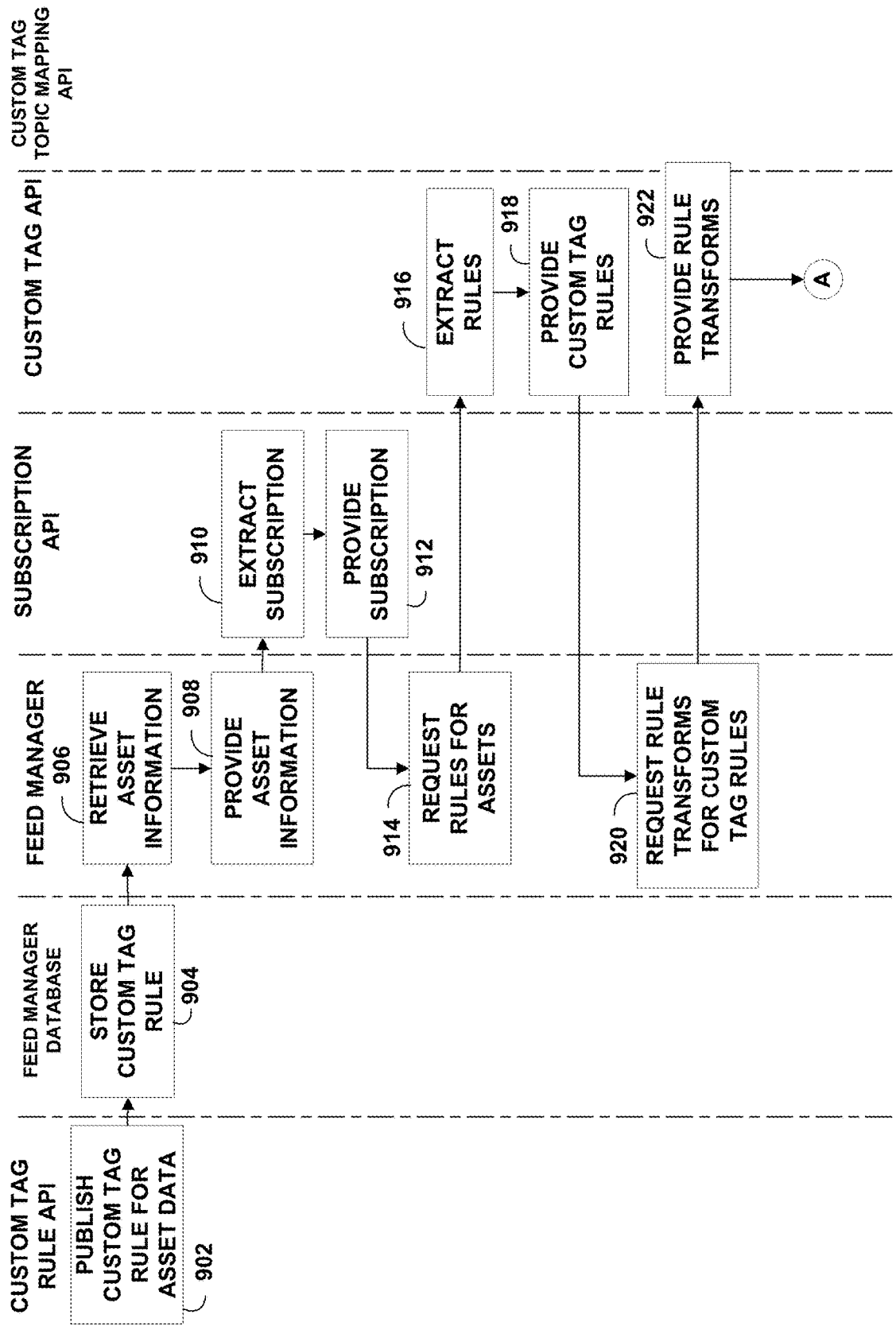
FIGS. 9A-9B depict a flowchart illustrating an example operation in accordance with the techniques of the disclosure.
Figure 9B:
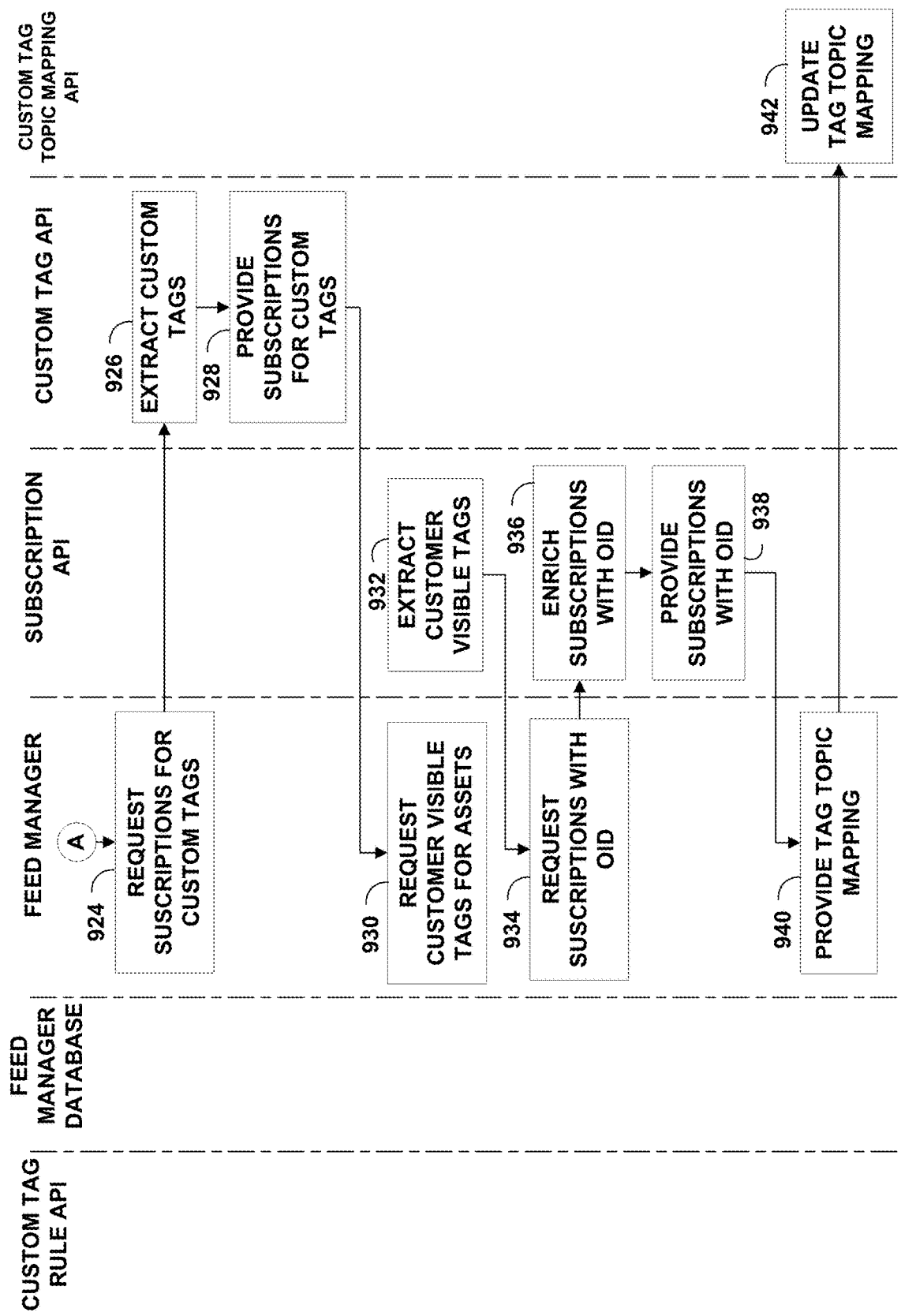

FIGS. 9A-9B depict a flowchart illustrating an example operation in accordance with the techniques of the disclosure. illustrating an example operation in accordance with the techniques of the disclosure. Specifically, the example of FIGS. 9A-9B illustrates an operation for reconciling custom tag rules for real-time feeds data changes. For convenience, FIGS. 9A-9B are described with respect to FIG. 5.

In one example, custom tag rule API 419 publishes custom tag rules for asset data (902). Feed manager database 508 stores the custom tag rule and provides the custom tag rule to feed manager 514 (904). Feed manager 514 retrieves asset information for the custom tag rule (906). Feed manager 514 provides the asset information for the custom tag rule to subscription API 314 (908). Subscription API 910 extracts a subscription from the custom tag rule (910) and provides the subscription to feed manager 514 (912).

Feed manager 514 requests, from custom tag API 420, custom tag rules for the assets (914). Custom tag API 420 extracts custom tag rules from the asset information (916) and provides the custom tag rules to feed manager 514 (918). Feed manager 514 requests, from custom tag API 420, a change log of custom tag rule transforms for the custom tag rules (920). Custom tag API 420 extracts the change log of rule transforms and provides the change log to feed manager 514 (922).

Feed manager 514 requests, from custom tag API 420, subscriptions for the custom tags (924). Custom tag API 420 extracts custom tags from the custom tag rules and subsequently extracts subscriptions from the custom tags (926). Custom tag API 420 provides subscriptions for the custom tags to feed manager 514 (928).

Feed manager 514 uses the subscriptions to request customer-visible tags for the assets from subscription API 314 (930). Subscription API 314 extracts customer-visible tags from the subscriptions and provides the customer-visible tags to feed manager 514 (932).

Feed manager 514 requests, from subscription API 314, subscriptions with OID information (934). Subscription API 314 enriches the subscriptions with OID information (936) and provides the subscriptions with OID information to feed manager 514 (938).

Further, feed manager 514 provides the tag topic mapping relationships to tag topic mapping database 442 (940) which stores the updated tag topic mapping relationships (942). In some examples, feed manager 514 also updates feed manager database 508 for both custom tags and customer-visible tags.

Figure 10:
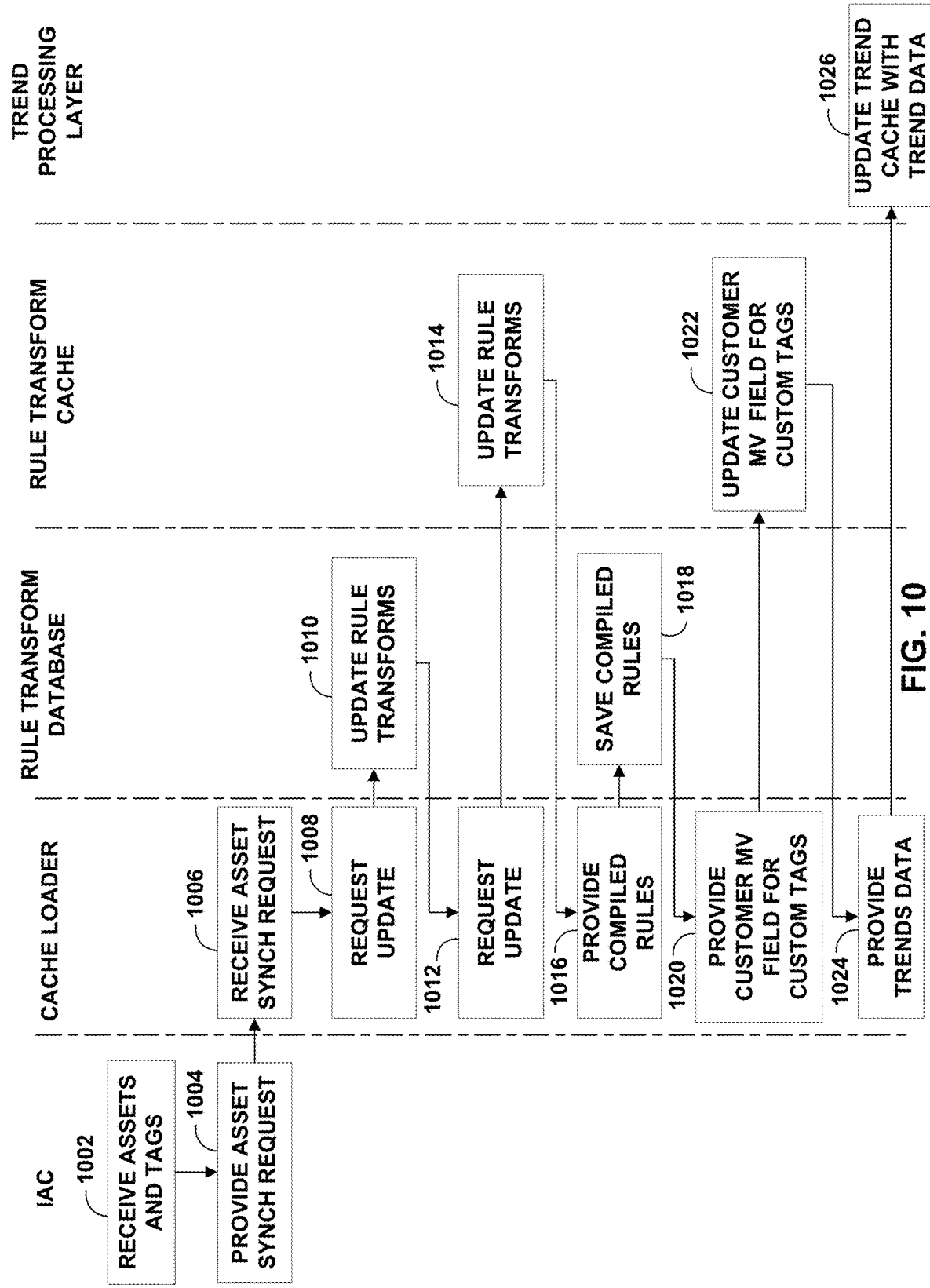
FIG. 10 is a flowchart illustrating an example operation in accordance with the techniques of the disclosure.

FIG. 10 is a flowchart illustrating an example operation in accordance with the techniques of the disclosure. Specifically, in the example of FIG. 10, an operation for creating and updating metadata for assets is described. In one example, the cache loader receives asset and tag information. For convenience, FIG. 10 is described with respect to FIG. 5.

In the example operation of FIG. 10, an IAC receives metadata changes for assets and asset tags (1002). The IAC provides a metadata asset synch request to cache loader 512 (1004). Cache loader 512 receives the asset synch request (1006) and requests, from rule transform database 506, an update to the rule transforms stored within rule transform database 506 (1008). In response to the update request, rule transform database 506 updates rule transforms for the assets and asset tags affected by the metadata changes (1010).

Further, cache loader 512 requests, from rule transform cache 516, an update to the rule transforms stored within rule transform cache 516 (1012). In response to the update request, rule transform cache 516 updates rule transforms for the assets and asset tags affected by the metadata changes (1014).

Cache loader 512 compiles rules based on the asset and tag information and provides the compiled rules to rule transform database 506 (1016). Rule transform database 506 stores the compiled rules (1018).

Cache loader 512 provides customer multi-value fields for the custom tags to rule transform cache 516 (1020). Rule transform cache 516 updates customer multi-value fields for the custom tags (1022).

Cache loader 512 provides trend data for the custom tags to trend processing layer 518 (1024). Trend processing layer 518 updates a trend cache with the trend data (1026).

Figure 11:
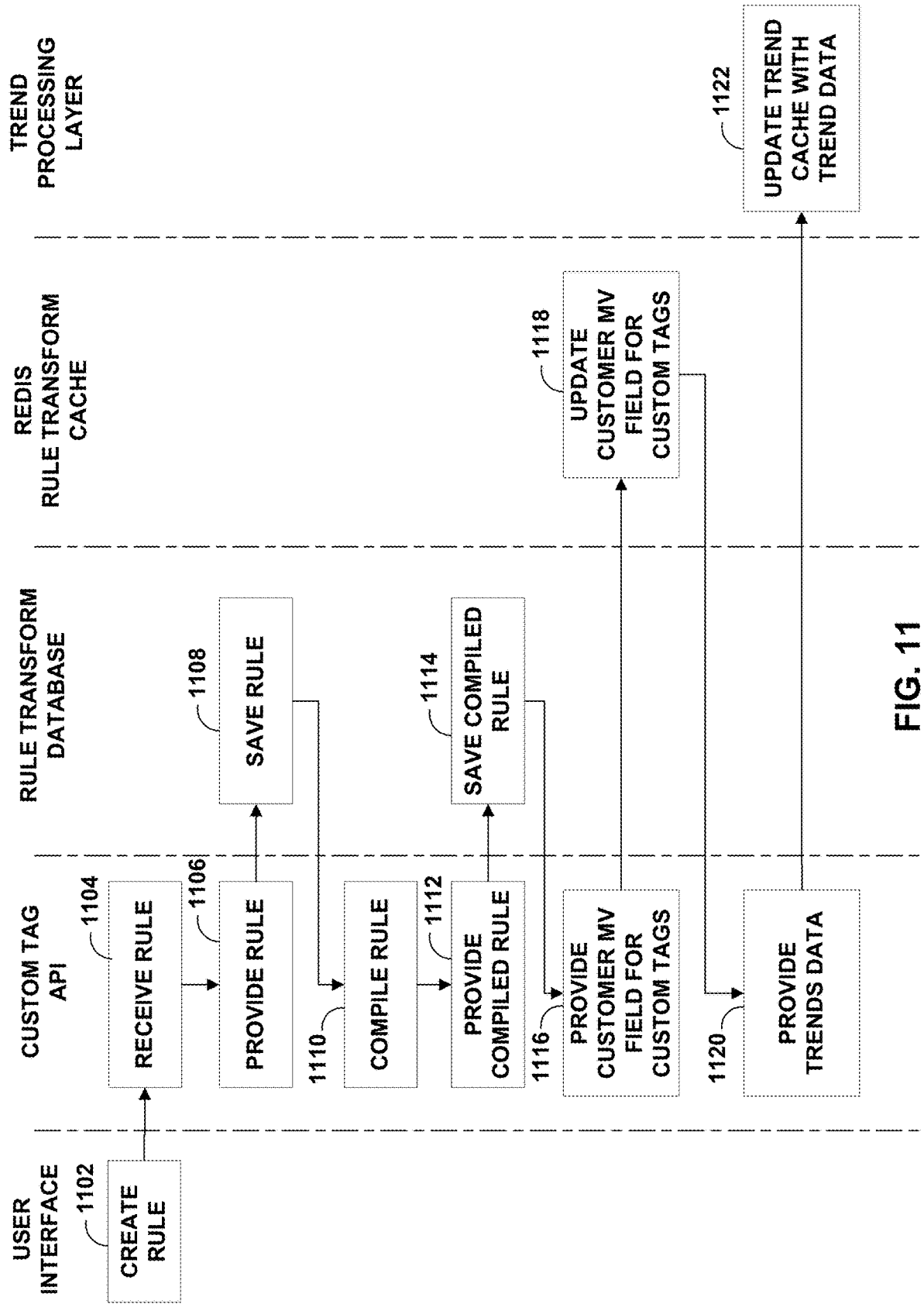
FIG. 11 is a flowchart illustrating an example operation in accordance with the techniques of the disclosure.

FIG. 11 is a flowchart illustrating an example operation in accordance with the techniques of the disclosure. Specifically, in the example of FIG. 11, an operation for creating rules for assets is described. For convenience, FIG. 11 is described with respect to FIGS. 4 and 5.

In the example operation of FIG. 11, a customer uses a user interface provided by API platform 302 to create an asset rule (1102). Custom tag API 420 receives the rule (1104) and provides the rule to rule transform database 506 (1106). Rule transform database 506 saves the rule (1108). Further, custom tag API 420 compiles the rule (1110) and provides the compiled rule to rule transform database 506 (1112), which saves the compiled rule (1114).

Cache loader 512 provides customer multi-value fields for the asset tags to rule transform cache 516 (1116). Rule transform cache 516 updates customer multi-value fields for the asset tags (1118). Cache loader 512 provides trend data for the asset tags to trend processing layer 518 (1120). Trend processing layer 518 updates a trend cache with the trend data (1122).

Figure 12:
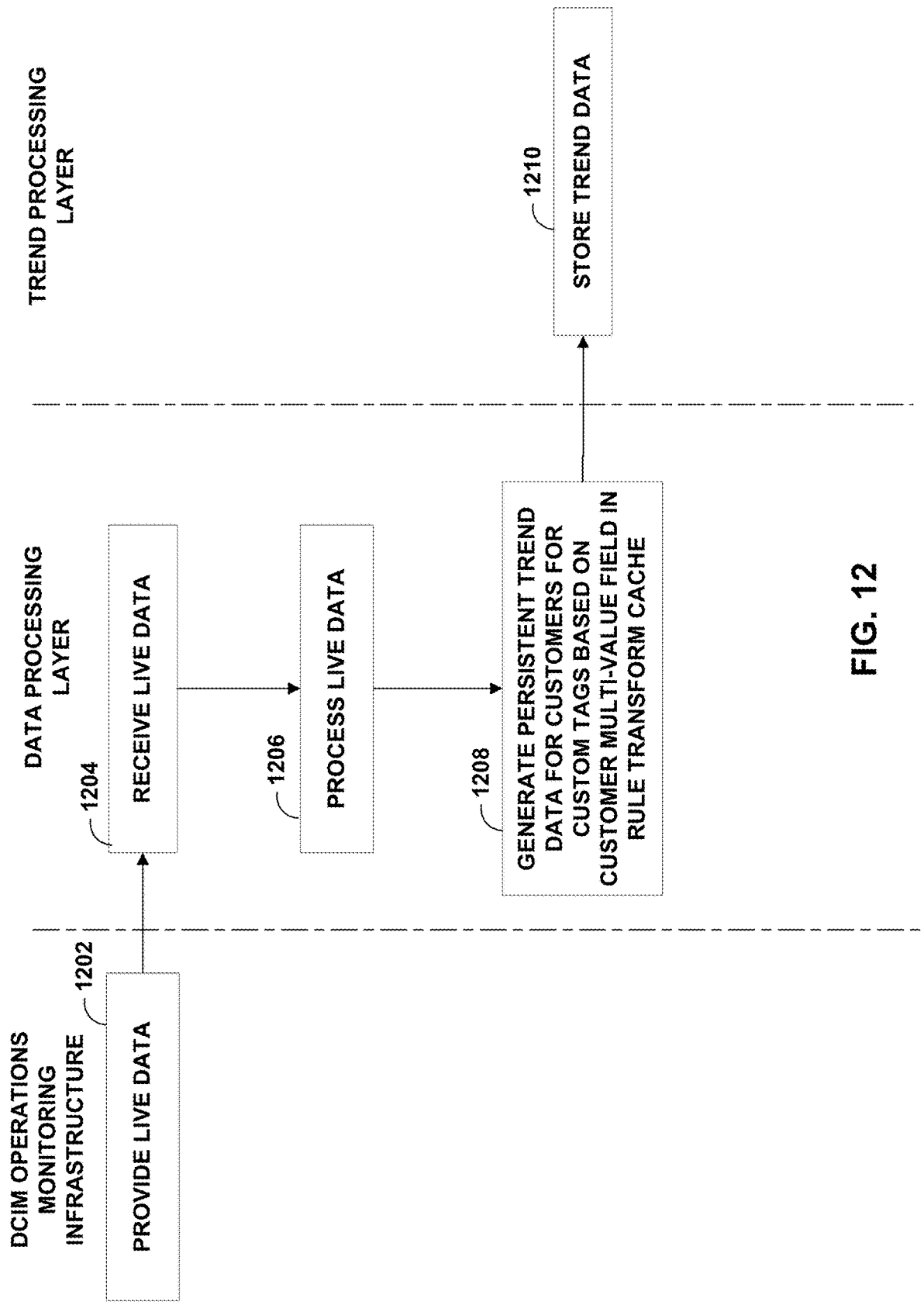
FIG. 12 is a flowchart illustrating an example operation in accordance with the techniques of the disclosure.

FIG. 12 is a flowchart illustrating an example operation in accordance with the techniques of the disclosure. Specifically, in the example of FIG. 12, an operation depicting the data flow of custom tag creation is depicted.

In the example of FIG. 12, an edge component of data center 12, such as DCIM operations monitoring infrastructure 24 of FIG. 2, receives real-time data for physical infrastructure assets of data center 12 and provides the live data to a data processing layer (1202). The data processing layer receives the live data (1204) and processes the data (1206) to generate persistent trend data for customers for customer tags based on customer multi-value fields in the feed manager database (1208). The data processing layer transmits the persistent trend data to trend processing layer 518, which stores the trend data in tag trend database 520 (e.g., such as a Cassandra database) (1210).

Figure 13:
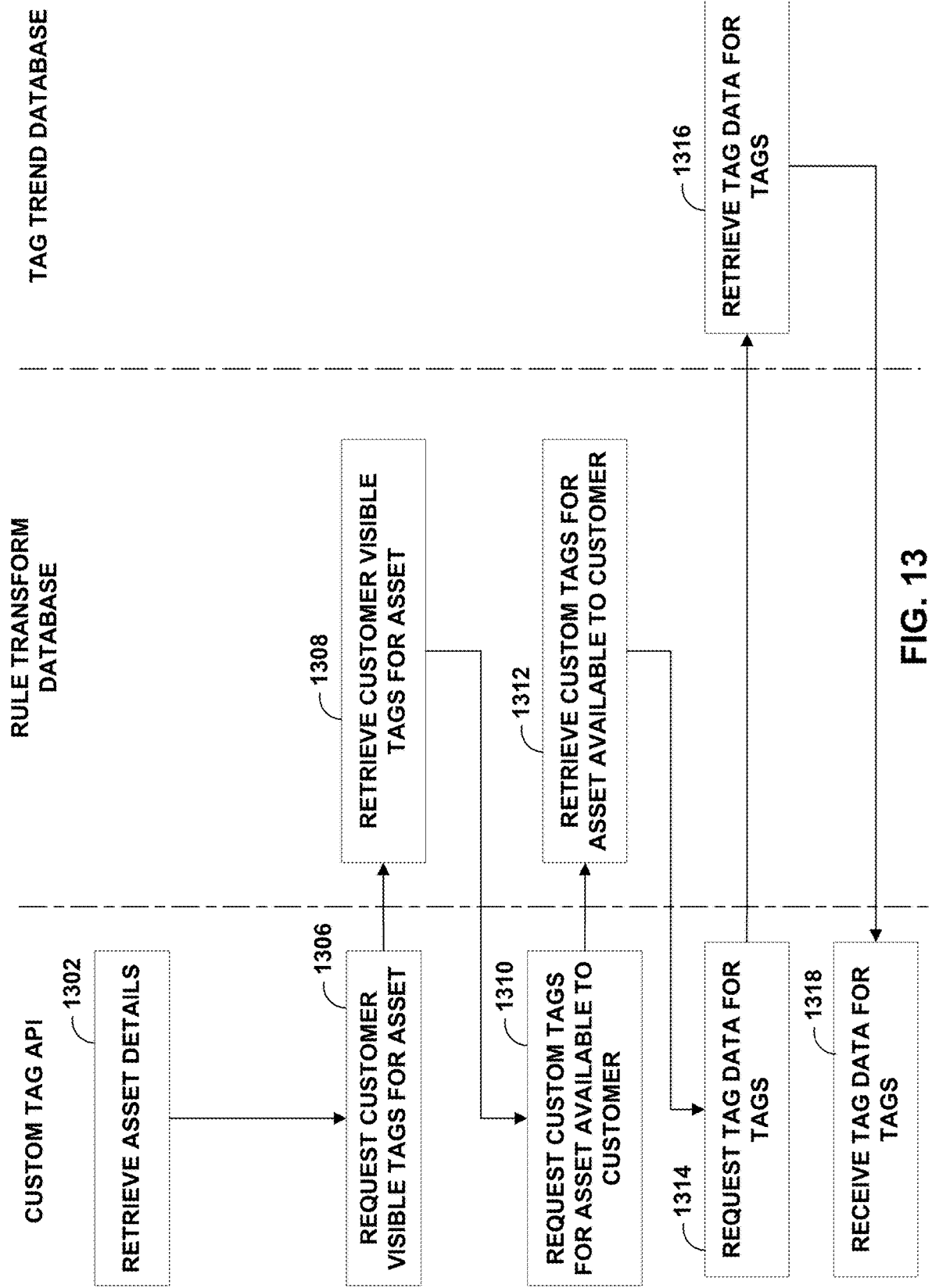
FIG. 13 is a flowchart illustrating an example operation in accordance with the techniques of the disclosure.

FIG. 13 is a flowchart illustrating an example operation in accordance with the techniques of the disclosure. Specifically, in the example of FIG. 13, an operation depicting the interaction between APIs exchanging custom tag information is depicted.

Custom tag API 420 retrieves asset details (1302). Custom tag API 420 requests, from rule transform database 506, customer-visible tags associated with a particular infrastructure asset 14 (1306). Rule transform database 506 retrieves custom tags visible to a particular customer ID available for the asset and provides the customer-visible tags to custom tag API 420 (1308). Further, custom tag API 420 requests, from rule transform database 506, custom tags for the asset available to a logged in customer (1310). Rule transform database 506 retrieves the custom tags for the asset and provides the custom tags for the asset to custom tag API 420 (1312).

Custom tag API 420 requests, from tag trend database 520, tag data for the custom tags for the asset (1314). Tag trend database 520 retrieves the tag data for the custom tags and provides the tag data to custom tag API 420 (1316). Custom tag API 420 receives, from tag trend database 520, the tag data for the custom tags for the asset (1314).

Figure 14:
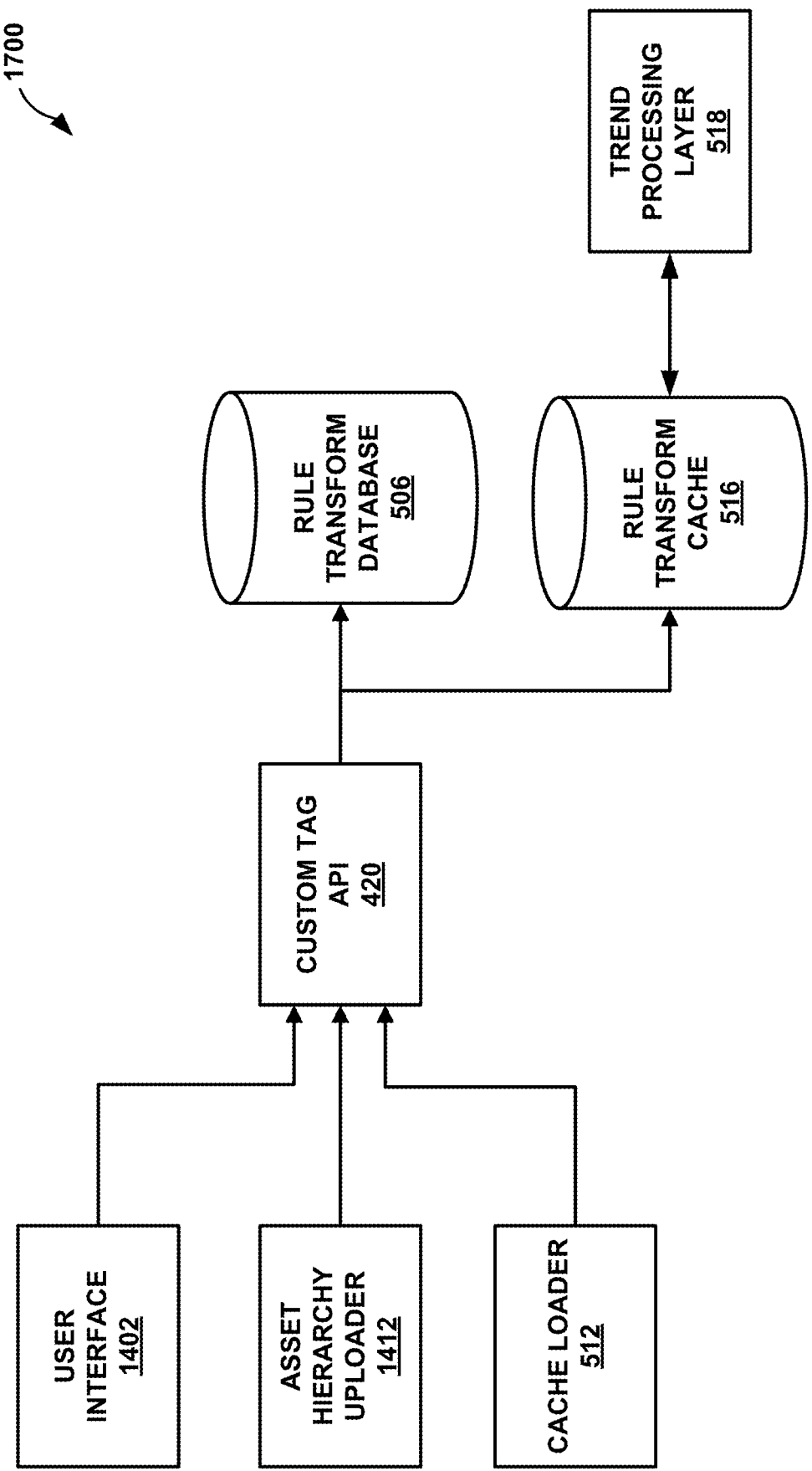
FIG. 14 is a block diagram illustrating an operation of the custom tag API of FIG. 4 in further detail.

FIG. 14 is a block diagram illustrating an operation of custom tag API 420 of FIG. 4 in further detail. System 1400 of FIG. 14 includes tag rule user interface 1402, custom tag API 420, rule transform cache 1408, rule transform database 506, asset hierarchy uploader component 1412, cache loader 512, and trend data processing layer 1416.

Tag rule user interface 1402 is configured to receive, from an administrator, configuration information for tag rules as well as to configure the visibility of tag rules to specific customers. Further, tag rule user interface 1402 permits a user to view tag rules or perform a manual synch of metadata for the tag rules.

Custom tag API 420 receives tag rules from tag rule user interface 1402 and saves the tag rules to rule transform database 506. Further, custom tag API 420 creates rule transforms based on the tag rules. Custom tag API 420 saves the rule transforms to rule transform cache 1408 with the custom rules. In some examples, custom tag API 420 is configured to update the custom rules with rule transforms generated in response to changes in tag metadata.

Asset hierarchy uploader 1412 is configured to detect changes to metadata that may affect customer asset linkage. Upon detecting such a change, asset hierarchy uploader 1412 invokes custom tag API 420 to update the tag rules and rule transforms to the cache for rule transforms.

Cache loader 512 is configured to detect any modifications to infrastructure assets 14. Upon detecting such a change, cache loader 512 invokes custom tag API 420 to update the tag rules and rule transforms to the cache for rule transforms.

Trend processing layer 518 stores persistent trend data for custom tags associated with a customer ID. In some examples, trend processing layer 518 operates to provide, to a customer in real-time, trend data associated with one or more custom tags.

FIG. 15 is an illustration of an example graphical user interface (GUI) 1500 for data center infrastructure management in accordance with the techniques of the disclosure. GUI 1500 provides a web-based dashboard for managing the feed manager of the present disclosure. In some examples, GUI 1500 provides an interface to allow a user to create rules, update rules, and/or synchronize rules for the feed manager. In further examples, GUI 1500 provides an interface to allow a user to filter subscription feeds based on customer ID, IBX, database, or data center, asset ID, tag ID, or by custom tags. In some examples, for each infrastructure entry, GUI 1500 depicts details of which tags are exposed to a customer based on a particular rule. Further, in some examples, GUI 1500 provides an interface to allow a user to modify asset instances to show to customers visible tags as well as the customers permitted to see each visible tag.

In some examples, the techniques of the disclosure include an API for fetching rules based on applied filters. In this example, the API fetches a rule, executes and saves a transformation for the rule. Further, the API updates the tag mapping database with the transformation based on the rule and permissions for the corresponding customer ID.

In still further examples, the system includes a new bolt which communicates with the API for fetching rules. In this example, for an input rule ID, the bolt makes an asynchronous request for one or more transformations and saves the transformations corresponding to the input rule ID. In further examples, the bolt is configured to receive tag processing data and, based on the received tag processing data, publishes feed data to the publisher API. In still further examples, trend processing layer 518 of tag database 520 reads data for custom tags and based on the custom tags, creates a customer-linked tag for use by the customer.

Figure 16:
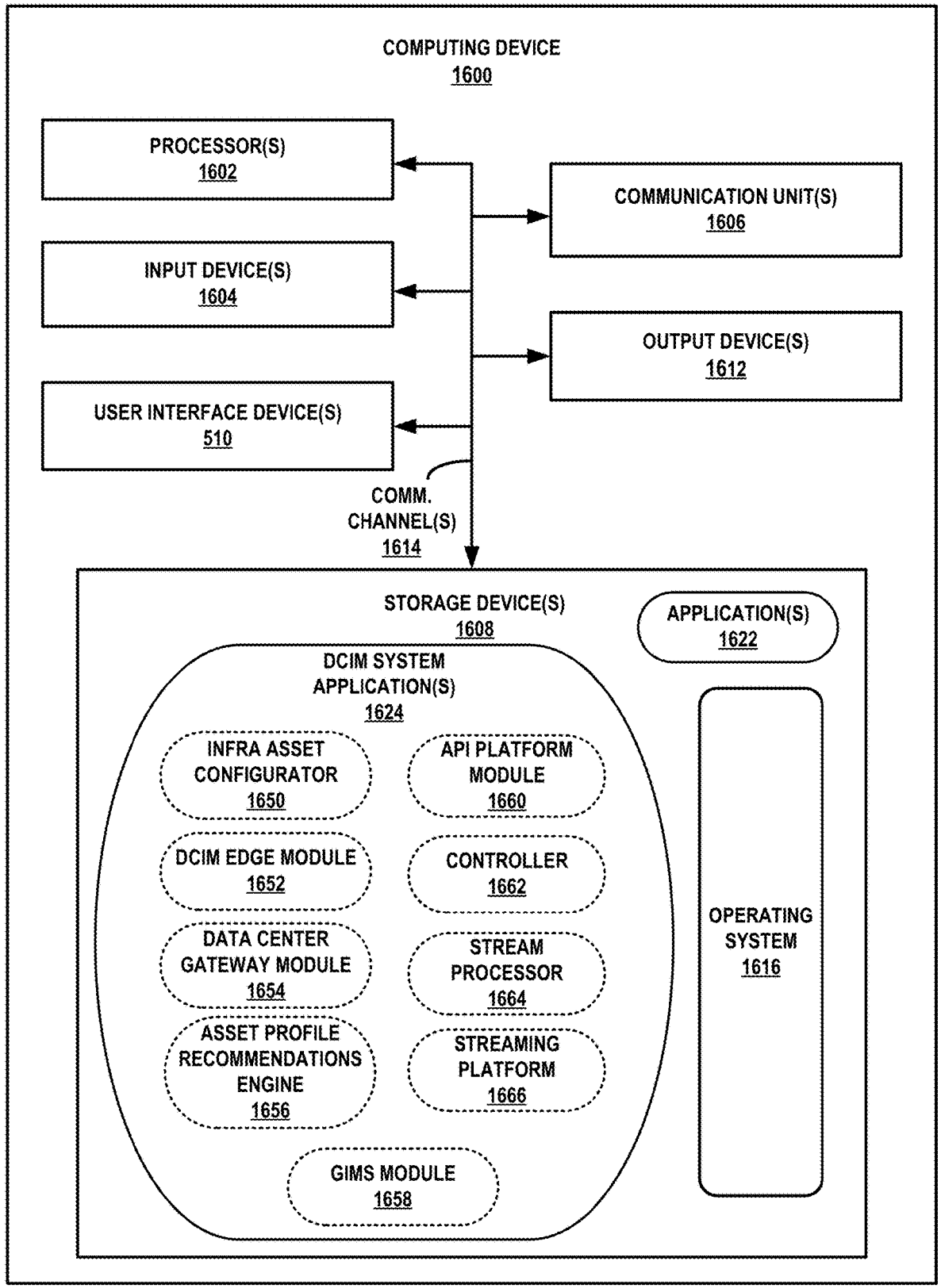
FIG. 16 is a block diagram illustrating further details of one example of a computing device that operates in accordance with one or more techniques of the present disclosure.

FIG. 16 is a block diagram illustrating further details of one example of a computing device that operates in accordance with one or more techniques of the present disclosure. FIG. 16 may illustrate a particular example of a server or other computing device 1600 that includes one or more processor(s) 1602 for executing any one or more of infra asset configurator 1650, DCIM edge module 1652, data center gateway module 1654, asset profile recommendations engine 1656, GIMS module 1658, API platform module 1660, controller 1662, stream processor 1664, streaming platform 1666, or any other application described herein. Other examples of computing device 1600 may be used in other instances. Computing device 1600 may be, for example, DCIM system 22 of FIG. 1 or FIG. 2, API platform 302, and components of DCIM platform 406. Although shown in FIG. 16 as a stand-alone computing device 1600 for purposes of example, a computing device may be any component or system that includes one or more processors or other suitable computing environment for executing software instructions and, for example, need not necessarily include one or more elements shown in FIG. 16 (e.g., communication units 1606; and in some examples components such as storage device(s) 1608 may not be co-located or in the same chassis as other components).

As shown in the example of FIG. 16 computing device 1600 includes one or more processors 1602, one or more input devices 1604, one or more communication units 1606, one or more output devices 1612, one or more storage devices 1608, and user interface (UI) device(s) 1610. Computing device 1600, in one example, further includes one or more application(s) 1622, DCIM system application(s) 1624, and operating system 1616 that are executable by computing device 1600. Each of components 1602, 1604, 1606, 1608, 1610, and 1612 are coupled (physically, communicatively, and/or operatively) for inter-component communications. In some examples, communication channels 1614 may include a system bus, a network connection, an inter-process communication data structure, or any other method for communicating data. As one example, components 1602, 1604, 1606, 1608, 1610, and 1612 may be coupled by one or more communication channels 1614.

Processors 1602, in one example, are configured to implement functionality and/or process instructions for execution within computing device 1600. For example, processors 1602 may be capable of processing instructions stored in storage device 1608. Examples of processors 1602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1608 may be configured to store information within computing device 1600 during operation. Storage device 1608, in some examples, is described as a computer-readable storage medium. In some examples, storage device 1608 is a temporary memory, meaning that a primary purpose of storage device 1608 is not long-term storage. Storage device 1608, in some examples, is described as a volatile memory, meaning that storage device 1608 does not maintain stored contents when the computer is turned off. Examples of volatile memories include random access memories (RAM), dynamic random access memories (DRAM), static random access memories (SRAM), and other forms of volatile memories known in the art. In some examples, storage device 1608 is used to store program instructions for execution by processors 1602. Storage device 1608, in one example, is used by software or applications running on computing device 1600 to temporarily store information during program execution.

Storage devices 1608, in some examples, also include one or more computer-readable storage media. Storage devices 1608 may be configured to store larger amounts of information than volatile memory. Storage devices 1608 may further be configured for long-term storage of information. In some examples, storage devices 1608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1600, in some examples, also includes one or more communication units 1606. Computing device 1600, in one example, utilizes communication units 1606 to communicate with external devices via one or more networks, such as one or more wired/wireless/mobile networks. Communication units 1606 may include a network interface card, such as an Ethernet card, an optical transceiver, a radio frequency transceiver, or any other type of device that can send and receive information. Other examples of such network interfaces may include 3G and WiFi radios. In some examples, computing device 1600 uses communication unit 1606 to communicate with an external device.

Computing device 1600, in one example, also includes one or more user interface devices 1610. User interface devices 1610, in some examples, are configured to receive input from a user through tactile, audio, or video feedback. Examples of user interface devices(s) 1610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1612 may also be included in computing device 1600. Output device 1612, in some examples, is configured to provide output to a user using tactile, audio, or video stimuli. Output device 1612, in one example, includes a presence-sensitive display, a sound card, a video graphics adapter card, or any other type of device for converting a signal into an appropriate form understandable to humans or machines. Additional examples of output device 1612 include a speaker, a cathode ray tube (CRT) monitor, a liquid crystal display (LCD), or any other type of device that can generate intelligible output to a user.

Computing device 1600 may include operating system 1616. Operating system 1616, in some examples, controls the operation of components of computing device 1600. For example, operating system 1616, in one example, facilitates the communication of one or more applications 1622 and DCIM system application(s) 1624 with processors 1602, communication unit 1606, storage device 1608, input device 1604, user interface devices 1610, and output device 1612.

Application 1622 and DCIM system application(s) 1624 may also include program instructions and/or data that are executable by computing device 1600. Example DCIM system application(s) 1624 executable by computing device 1600 may include any one or more of infra asset configurator 1650, DCIM edge module 1652, data center gateway module 1654, asset profile recommendations engine 1656, GIMS module 1658, API platform module 1660, controller 1662, stream processor 1664, and streaming platform 1666, each illustrated with dashed lines to indicate that these may or may not be configured for execution by any given example of computing device 1600. Other DCIM system applications not shown may alternatively or additionally be included, providing other functionality described herein.

In this example, DCIM system applications 1624 include infra asset configurator 1650, DCIM edge module 1652, data center gateway module 1654, asset profile recommendations engine 1656, GIMS module 1658, API platform module 1660, controller 1662, stream processor 1664, and streaming platform 1666. Infra asset configurator 1650 may include instructions for causing computing device 1600 to perform one or more of the operations and actions described in the present disclosure with respect to infra asset configurator 44. DCIM edge module 1652 may include instructions for causing computing device 1600 to perform one or more of the operations and actions described in the present disclosure with respect to DCIM edge 16. Data center gateway module 1654 may include instructions for causing computing device 1600 to perform one or more of the operations and actions described in the present disclosure with respect to any of data center gateways 34, 110, 140. Asset profile recommendations engine 1656 may include instructions for causing computing device 1600 to perform one or more of the operations and actions described in the present disclosure with respect to asset profile recommendations. For example, when an asset such as a UPS, for example, is introduced into the DCIM system, the asset profile recommendations engine 1656 may automatically identify an asset type based on tag points, and recommend a configuration setup based on how other assets of the same type in other data centers are configured, resulting in the introduced asset being more operationally efficient based on the setup of similar assets in the other data centers. GIMS module 1658 may include instructions for causing computing device 1600 to perform one or more of the operations and actions described in the present disclosure with respect to GIMS 42.

API platform module 1660, controller 1662, stream processor 1664, and streaming platform 1666 represent applications executed by computing device 1600 to perform operations described with respect to computing system 300 of FIG. 3 and computing system 400 of FIG. 4. More specifically, API platform module 1660 may exchange data with communication unit(s) 1606 and perform operations described with respect to API platform 302. Controller 1662 may exchange data with communication unit(s) 1606 and perform operations described with respect to controller 410. Stream processor 1664 may exchange data with communication unit(s) 1606 and perform operations described with respect to real-time data stream processor 411. Streaming platform 1666 may exchange data with communication unit(s) 1606 and perform operations described with respect to data streaming platform 418.

Tag real-time data that is available on heterogeneous distributed system architecture may need an online transaction processing system to update the live registry of data feeds. Such a registry is used by service APIs that publish the tag data to a customer. A conventional system may handle custom tag rule transforms synchronously as a part of the custom rule creation and update operations. Typically, tag-topic:provider mapping is stored in a tag mapping database and used by the data processing layer to publish tag data to respective provider:topic subscriptions. If both the data-processing layer topology worker and the tag mapping database sentinel crash at the same time, the system may lose meta-data changes that happen as a part of cache loader executions. Thus, a conventional system may be required to requeue to the feed-manager any meta-data changes that occur as a part of cache-loader executions N minutes prior to the crash.

In accordance with the techniques of the disclosure, a real-time processor is disclosed for a messaging service that provides access to data center event data for non-customer physical infrastructure assets via dynamically configurable custom tags defined by customers. The techniques may provide one or more technical advantages. For example, the data center infrastructure monitoring and messaging service described herein may enable customers, developers, Internet of Things (IoT) or other devices, and management systems to consume, in near real-time, event data including customized machine data feeds generated by one or more data center monitoring systems for globally distributed data centers having a large scale of infrastructure components that may be located in multiple regions and metropolitan areas. The techniques for customized tags, as described herein, may allow the customer to create rules that match certain criteria to customer tags that are then exposed using the subscription APIs. Such techniques may enable custom integration with customer dashboards and provide near real-time actionable information to API consumer and data center operators.

The real-time processor may be configured to handle transactions pertaining to real-time feeds, such as machine and power consumption data. The feed manager of the real-time processor internally maintains a live registry of tags associated to a publisher topic. The feed manager constantly updates the live registry based on changes in metadata defined by either subscriptions of a user or custom tag rules defined by the user. Real-time feeds are made available to a customer as described above. Thus, by have a single queue sequential request processing engine that handles feed registrations by the user, metadata changes for custom tag rules, as well as similar metadata changes, may occur in the data processing layer under the cache loader module.

Additionally, the feed manager described herein may be more fault tolerant and reliable in that meta-data the system does not need to requeue changes that happen as a part of cache loader executions due to simultaneous crashes by the data-processing layer topology worker and the tag mapping database sentinel. Furthermore, the feed manager described herein may handle custom tag rule transforms asynchronously. In some examples, the feed manager may handle custom tag rule transforms with an expected delay of about 5 seconds with a maximum delay of about 30 seconds.

Such a feed manager as described herein may also have a lower initial system and operational footprint than conventional systems. The feed manager described herein may further provide enhanced scalability by allowing for the creation of separate infra or different platforms for real-time feeds as the usage of the real-time feature increases. Furthermore, the feed manager described herein may be more portable than conventional systems because it may be implemented independent from the platform or data processing layer that the feed manager executes on.

As described herein, real-time feeds refer to data, such as machine data, static data, dynamic data, calculated data, or power consumption data, that is sourced via a supported publication-subscription channel. The feed manager described herein manages the event-topic mapping used by the data processing layer. The feed manager may update event-topic mapping due to created or updated feed registrations, such as DCIM-API or DCIM-subscription changes, custom tag rule changes, or meta-data changes that occur as a part of cache-loader executions. The feed manager may further be extended to handle changes in feeds as a part of changes in user account entitlement changes. Further description of the implementation of the feed-manager and the run-time environment of the feed-manager is set forth below.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset. If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor. A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   monitoring, by a data center infrastructure monitoring system of a data center, a plurality of physical infrastructure assets that enable system operation within the data center for a plurality of events;
   applying, by the data center infrastructure monitoring system, one or more custom tags to the plurality of physical infrastructure assets, wherein each of the one or more custom tags is associated with a particular customer of the data center and specifies one or more attributes of the plurality of physical infrastructure assets;
   receiving, by the data center infrastructure monitoring system, a subscription request to event data for a topic to which the data center infrastructure monitoring system publishes event data for the plurality of physical infrastructure assets to which the one or more custom tags are applied; and
   publishing, by the data center infrastructure monitoring system and to a subscription application programming interface, the event data for the topic.

2. The method of claim 1, wherein applying the one or more custom tags to the plurality of physical infrastructure assets comprises:
   receiving, by the data center infrastructure monitoring system, one or more custom tag rules, wherein a custom tag rule application programming interface defines the one or more custom tag rules in response to input from the customer, and wherein each of the one or more custom tag rules specifies a custom tag of the one or more custom tags and a rule for applying the custom tag to assets of the plurality of physical infrastructure assets; and
   applying, based on the one or more custom tag rules, the one or more custom tags to the plurality of physical infrastructure assets.

3. The method of claim 2, further comprising updating, by the data center infrastructure monitoring system and in response to receiving one or more custom tag rules, a data topic map of the one or more custom tag rules to the topic to which the data center infrastructure monitoring system publishes event data for the plurality of physical infrastructure assets to which the one or more custom tags are applied.

4. The method of claim 1, further comprising receiving, by the data center infrastructure monitoring system, metadata describing one or more changes to one or more physical infrastructure assets of the plurality of physical infrastructure assets.

5. The method of claim 4, further comprising updating, by the data center infrastructure monitoring system, the subscription request to the event data for the topic based on the received metadata.

6. The method of claim 4, further comprising updating, by the data center infrastructure monitoring system, visibility of the event data for the topic based on the received metadata for a customer associated with the subscription.

7. The method of claim 1, further comprising determining, by the data center infrastructure monitoring system, that the event data for the topic is visible to a customer associated with the subscription request prior to publishing the event data for the topic to the subscription application programming interface.

8. The method of claim 1, further comprising:
receiving, by the data center infrastructure monitoring system, the one or more custom tags; and
storing, by the data center infrastructure monitoring system, the one or more custom tags in a custom tag database of the data center infrastructure monitoring system.

9. The method of claim 1, wherein the one or more custom tags are defined by a custom tag application programming interface in response to input from a customer associated with the subscription.

10. The method of claim 1, wherein the one or more custom tags describe one or more of:
a geographic location of the data center;
a customer identifier;
an asset identifier; or
a text string provided by a customer associated with the subscription.

11. The method of claim 1, wherein at least one of the plurality of physical infrastructure assets is a non-customer physical infrastructure asset, and the non-customer physical infrastructure asset is not allocated to the customer of the data center.

12. A data center infrastructure monitoring system configured to:
monitor a plurality of physical infrastructure assets that enable system operation within the data center for a plurality of events;
apply one or more custom tags to the plurality of physical infrastructure assets, wherein each of the one or more custom tags is associated with a particular customer of the data center and specifies one or more attributes of the plurality of physical infrastructure assets;
receive a subscription request to event data for a topic to which the data center infrastructure monitoring system publishes event data for the plurality of physical infrastructure assets to which the one or more custom tags are applied; and
publish, to a subscription application programming interface, the event data for the topic.

13. The system of claim 12, wherein, to apply the one or more custom tags to the plurality of physical infrastructure assets, the data center infrastructure monitoring system is further configured to:
receive one or more custom tag rules, wherein a custom tag rule application programming interface defines the one or more custom tag rules in response to input from the customer, and wherein each of the one or more custom tag rules specifies a custom tag of the one or more custom tags and a rule for applying the custom tag to assets of the plurality of physical infrastructure assets; and
apply, based on the one or more custom tag rules, the one or more custom tags to the plurality of physical infrastructure assets.

14. The system of claim 13, wherein the data center infrastructure monitoring system is further configured to update, in response to receiving one or more custom tag rules, a data topic map of the one or more custom tag rules to the topic to which the data center infrastructure monitoring system publishes event data for the plurality of physical infrastructure assets to which the one or more custom tags are applied.

15. The system of claim 12, wherein the data center infrastructure monitoring system is further configured to receive metadata describing one or more changes to one or more physical infrastructure assets of the plurality of physical infrastructure assets.

16. The system of claim 15, wherein the data center infrastructure monitoring system is further configured to update the subscription request to the event data for the topic based on the received metadata.

17. The system of claim 15, wherein the data center infrastructure monitoring system is further configured to update visibility of the event data for the topic based on the received metadata for a customer associated with the subscription.

18. The system of claim 12, wherein the data center infrastructure monitoring system is further configured to determine that the event data for the topic is visible to a customer associated with the subscription request prior to publishing the event data for the topic to the subscription application programming interface.

19. The system of claim 12, wherein the data center infrastructure monitoring system is further configured to:
receive the one or more custom tags; and
store the one or more custom tags in a custom tag database of the data center infrastructure monitoring system.

20. The system of claim 12, wherein the one or more custom tags are defined by a custom tag application programming interface in response to input from a customer associated with the subscription.

21. The system of claim 12, wherein the one or more custom tags describe one or more of:
a geographic location of the data center;
a customer identifier;
an asset identifier; or
a text string provided by a customer associated with the subscription.

22. The system of claim 12, wherein at least one of the plurality of physical infrastructure assets is a non-customer physical infrastructure asset, and the non-customer physical infrastructure asset is not allocated to the customer of the data center.

23. The system of claim 12, further comprising the plurality of physical infrastructure assets.

24. A non-transitory computer-readable medium comprising instructions that, when executed, cause one or more processors executing a data center infrastructure monitoring system to:
  receive one or more custom tag rules, wherein a custom tag rule application programming interface defines the one or more custom tag rules in response to input from a customer, and wherein each of the one or more custom tag rules specifies a custom tag of the one or more custom tags and a rule for applying the custom tag to assets of a plurality of physical infrastructure assets;
  apply, based on the one or more custom tag rules, the one or more custom tags to the plurality of physical infrastructure assets;
  receive a subscription request to event data for a topic to which the data center infrastructure monitoring system publishes event data for the plurality of physical infrastructure assets to which the one or more custom tags are applied; and
  publish, to a subscription application programming interface, the event data for the topic.

* * * * *